United States Patent
Rogaway

(10) Patent No.: US 7,046,802 B2
(45) Date of Patent: May 16, 2006

(54) METHOD AND APPARATUS FOR FACILITATING EFFICIENT AUTHENTICATED ENCRYPTION

(76) Inventor: Phillip W. Rogaway, 1212 Purdue Dr., Davis, CA (US) 95616

( * ) Notice: Subject to any disclaimer, the term of this patent is extended or adjusted under 35 U.S.C. 154(b) by 843 days.

(21) Appl. No.: 09/918,615

(22) Filed: Jul. 30, 2001

(65) Prior Publication Data

US 2002/0071552 A1 Jun. 13, 2002

Related U.S. Application Data

(60) Provisional application No. 60/267,640, filed on Feb. 9, 2001, provisional application No. 60/240,471, filed on Oct. 12, 2000.

(51) Int. Cl.
*H04K 1/04* (2006.01)
(52) U.S. Cl. .......................... 380/37; 380/28
(58) Field of Classification Search ................. 380/37, 380/28, 286
See application file for complete search history.

(56) References Cited

U.S. PATENT DOCUMENTS

2001/0033656 A1* 10/2001 Gligor et al. .................. 380/28
2001/0046292 A1* 11/2001 Gligor et al. .................. 380/37
2002/0048364 A1* 4/2002 Gligor et al. .................. 380/37

OTHER PUBLICATIONS

Black, Halevi, Krawczyk, Krovetz, Rogaway. UMAC: Fast and Secure Message Authentication. 1999.*
Jutla, Charanjit. Encryption Modes with Almost Free Message Integrity. Aug. 2000.*
Menezes, Alfred J. Handbook of Applied Cryptography. 1997. CRC Press. pp. 321-383.*
Press, William H. Numerical Recipes in C: The Art of Scientific Computing. 1992. Cambridge University Press.*
Jueneman, Matyas, Meyer. Message Authentication with Manipulation Detection Codes. Computer Sciences Corp and IBM Corp. 1988.*
Gligor and Donescu. Fast Encryption and Authentication. XCBC Encryption and XECB Authentication Modes. Oct. 27, 2000.*

* cited by examiner

*Primary Examiner*—Emmanuel L. Moise
*Assistant Examiner*—Kevin Schubert
(74) *Attorney, Agent, or Firm*—Park, Vaughan & Fleming LLP

(57) ABSTRACT

A block-cipher based encryption scheme providing both privacy and authenticity that encrypts an arbitrary-length message into a minimal-length ciphertext. In one embodiment, "OCB", a message is encrypted using a nonce by partitioning it into 128-bit message blocks and a possibly shorter message fragment. A sequence of offsets is computed from the nonce and block cipher using shifts and conditional xors. Each message block is xored with an offset, enciphered, and xored with the offset, yielding a ciphertext block. The length of the message fragment is encoded, xored with an offset, enciphered to give a pad, truncated, and xored with the message fragment to give a ciphertext fragment. A checksum is formed by xoring the message blocks, the padded ciphertext fragment, and the pad. It is xored with an offset and enciphered to yield a tag. The ciphertext is the ciphertext blocks, the ciphertext fragment, and the tag.

4 Claims, 10 Drawing Sheets

METHOD AND APPARATUS FOR FACILITATING EFFICIENT AUTHENTICATED ENCRYPTION

RELATED APPLICATION

This application hereby claims priority under 35 U.S.C. section 119 to U.S. Provisional Patent Application No. 60/240,471, filed Oct. 12, 2000, and U.S. Provisional Application Ser. No. 60/267,640, filed Feb. 9, 2001. The above-referenced Provisional Patent applications are hereby incorporated by reference.

BACKGROUND

1. Field of the Invention

The present invention relates generally to cryptographic techniques for the construction of symmetric (shared-key) encryption schemes, and more particularly, to ways to use a block cipher in order to construct a highly efficient encryption scheme that simultaneously provides both message privacy and message authenticity.

2. Related Art

When two parties, a Sender and a Receiver, communicate, the parties often need to protect both the privacy and the authenticity of the transmitted data. Protecting the privacy of the data ensures that unauthorized parties will not understand the content of transmissions. Protecting the authenticity of the data provides assurance to the Receiver that the actual Sender of a message coincides with the claimed Sender of the message (and it thereby provides assurance to the Receiver that the message was not accidentally or intentionally modified in transit). Both goals are often accomplished using symmetric ("shared key") techniques, wherein the Sender and the Receiver make use of a shared key K. We call "authenticated encryption" the goal of simultaneously achieving both privacy and authenticity using shared-key techniques. In an authenticated-encryption method, the Sender can encrypt a message using a key and a nonce (also called an Initialization Vector, or IV) to yield a ciphertext. The Receiver can decrypt a ciphertext using a key and a nonce to yield either a message or a special symbol, invalid, that indicates to the Receiver that the ciphertext should be regarded as inauthentic.

The most common approach for authenticated encryption uses two different tools: for privacy, a privacy-only encryption scheme, and for authenticity, a message authentication code (MAC). Privacy-only encryption schemes compute a ciphertext from a plaintext, a key, and a nonce. Message authentication codes compute an authentication tag (which is a fixed-length string) from a message and a key. To MAC a message means to computes its authentication tag using a message authentication code.

Many constructions for privacy-only encryption schemes and many constructions for message authentication codes are known in the art. Some are described, for example, in the book of Menezes, van Oorschot and Vanstone, *Handbook of Applied Cryptography*, published by CRC Press, 1997. Both privacy-only encryption schemes and message authentication codes are commonly based on the use of a block cipher.

By way of further background, a block cipher is a function E that takes a key K and a message block X, the key being a binary string from some set of allowed keys and the message block being a binary string of some fixed length n. The block cipher returns a ciphertext block $Y=E_K(X)$, which is also a binary string of length n. The number n is called the block length of the block cipher. It is required that for each key K, the function $E_K$ is one-to-one and onto (in other words, it is a bijection on the space of n-bit strings). Since $E_K$ is one-to-one and onto, it has a well-defined inverse, denoted $E_K^{-1}$. Well known block ciphers include the algorithm of the Data Encryption Standard (DES), which has a block length of n=64 bits, and the algorithm of the Advanced Encryption Standard (AES), which has a block length of n=128 bits. We shall speak of "applying a block cipher" or "enciphering" to refer to the process of taking an n-bit string X and computing from it a string $Y=E_K(X)$ for some understood key K and block cipher E. Similarly, we shall speak of "deciphering" to refer to the process of taking an n-bit string Y and computing from it a string $X=E_K^{-1}(Y)$.

The most common approach for privacy-only encryption using an n-bit block cipher E is CBC encryption (cipher block chaining encryption). In the "basic" form of CBC encryption, the message M that we wish to encrypt must be a binary string of length that is a positive multiple of the block length n. The message M is partitioned into n-bit blocks M[1], M[2], . . . , M[m] by taking M[1] as the first n bits of M, taking M[2] as the next n bits of M, and so forth. An n-bit nonce, IV, is selected. Then one encrypts M using the key K and the nonce IV by computing, for each $i \in [1 \ldots m]$, the ciphertext block $$C[i]=E_K(C[i-1] \oplus M[i])$$

where C[0]=IV. The complete ciphertext is IV together with the ciphertext C=C[1] . . . C[m].

Nonces are used quite generally for shared-key encryption. A nonce is a value used at most once (or almost certainly used at most once) within a given context. Most often, nonces are realized using a counter or random value. For CBC encryption, a random value should be used; for CBC encryption, there are problems with using a counter IV.

The most common approach for making a message authentication code using an n-bit block cipher E is the CBC MAC (cipher block chaining message authentication code). In the "basic" form of the CBC MAC, the message M to be authenticated must be a binary string having a length that is a positive multiple of n. The message M is partitioned into n-bit blocks M[1], M[2], . . . , M[m] by taking M[1] as the first n bits of M, taking M[2] as the next n bits of M, and so forth. One then computes the authentication tag of M, using key K, by way of the same algorithm used for CBC encryption, but where the IV=0, the block of n zero bits, and where the authentication tag is the final ciphertext block, Tag=C[m]. Only Tag, or a prefix of Tag, is output as the authentication tag. A Receiver who obtains an authenticated message M∥Tag checks the validity of M by re-computing the CBC MAC of M under key K, obtaining a string Tag', and verifying that Tag' is identical to Tag.

To combine CBC encryption and the CBC MAC, in order to obtain both privacy and authenticity, use the generic composition method. One uses two keys: an encryption key Ke and a message-authentication key Ka. In one method for generic composition, the message M is CBC encrypted using key Ka and nonce IV to yield an intermediate ciphertext $C_{int}$=IV∥C[1] . . . C[m]. Then the intermediate ciphertext $C_{int}$ is MACed using the CBC MAC under key Ka to yield an authentication tag Tag. The ciphertext for the authenticated-encryption scheme is C=C[1] . . . C[m]∥Tag. The Receiver, on receipt of IV and C[1] . . . C[m]∥Tag, checks that Tag is the CBC MAC of $C_{int}$=IV∥C[1] . . . C[m] under key Ka. If the received Tag is what the Receiver computes it should be, the Receiver decrypts C[1] . . . C[m] using key Ke and nonce IV to obtain the plaintext M. If the received Tag is different from what the Receiver computes it should be, the Receiver rejects the received ciphertext C=C[1] . . . C[m]||Tag, regarding it as invalid.

The same generic-composition approach can be used to combine any privacy-only encryption scheme with any message authentication code.

There are a number of limitations to the generic composition approach. The main limitation is that two sequential computing passes are made over the data, one to privacy-only encrypt and one to MAC, making the process twice as slow as privacy-only encryption (assuming that privacy-only encryption and MAC computation take about the same amount of time, as they would for CBC encryption and the CBC MAC). Privacy-only encryption can be computationally expensive, and adding in a major additional expense to ensure message authenticity is considered undesirable in many settings.

Because of the limitation just described, individuals have tried for many years to merge privacy and authenticity into a single, unified process that would be nearly as fast as conventional ways to do privacy-only encryption. Until quite recently, all such attempts failed. For a history of some of the failed attempts, see the survey article of Bart Preneel entitled *Cryptographic Primitives for Information Authentication—State of the Art*, appearing in *State of the Art of Applied Cryptography, COSIAC '97*, Lecture Notes in Computer Science, vol. 1528, Springer-Verlag, pp. 49–104, 1998. As an example of a particularly recent attempt, Gligor and Donescu describe an incorrect authenticated-encryption mode in their paper *Integrity Aware PCBC Encryption*, appearing in *Security Protocols, 7th International Workshop*, Cambridge, UK, Apr. 19–21, 1999, Lecture Notes in Computer Science, vol. 1796, Springer-Verlag, pp. 153–171, 2000.

The first publicly disclosed authenticated-encryption scheme that achieves nearly the speed of a conventional, privacy-only encryption scheme, was developed by Charanjit Jutla, of IBM. Jutla describes two authenticated-encryption methods in his paper *Encryption Modes with Almost Free Message Integrity*, which first appeared in the Cryptology ePrint Archive on Aug. 1, 2000. (Later versions of this paper subsequently appeared in *Advances in Cryptology—Eurocrypt 2001*, Lecture Notes in Computer Science, vol. 2045, Springer-Verlag, May 2001, and as a submission to NIST (the National Institute of Standards and Technology), posted on NIST's website on Apr. 17, 2001.) One of Jutla's schemes is similar to CBC encryption and is called IACBC. The other one of Jutla's scheme is parallelizable mode that Jutla calls IAPM. Jutla's IACBC scheme is illustrated in FIG. 6, while his IAPM scheme is illustrated in FIG. 7.

Both IACBC and IAPM are authenticated-encryption schemes based on an n-bit block cipher, E. The modes require that the message M which is to be encrypted has a length which is a positive multiple of the block length n: say M=M[1] . . . M[m], where each M[i] is n bits long. The schemes employ two block-cipher keys, K1 and K2, which together comprise the encryption key K=(K1, K2). Conceptually, there are two processes involved: a "make-offset process" and a "main process". The make-offset process is the same for IACBC and IAPM, while the main process in the two schemes differ.

Refering to the left hand side of FIGS. 6 and 7, the make-offset process in IACBC and IAPM uses the key K2 to map a random nonce, R, into a sequence of "pairwise independent" offsets, Z=Z[0], . . . , Z[m], Z[m+1]. Notice that one needs two more offsets than the message M is long (measured in blocks). Each offset is n bits. Jutla describes two different methods to realize the make-offset process. We shall describe these methods shortly; for now we view the production of offsets as a black-box process and we continue the explanation of the main-process of IACBC and IAPM.

The main process of IACBC is shown in the right-hand side of FIG. 6. Having used the key K2 and the nonce R to derive offsets Z[0], . . . , Z[m+1], encipher nonce R, now under key K1, to determine an initial chaining value, Y[0] =C[0]=$E_{K1}$(R). Then CBC encrypt M=M[1] . . . M[m]: for i∈[1 . . . m], let Y[i]=$E_{K1}$(Y[i−1]⊕M[i]). Next, mask each of these block-cipher outputs to determine a ciphertext block: for i∈[1 . . . m], let C[i]=Y[i]⊕Z[i]. Call the string C=C[1] . . . C[m] is the "ciphertext core". Next one computes a "checksum", Checksum, by xoring the message blocks: Checksum=M[1]⊕ . . . ⊕M[m]. Next one forms an "authentication tag" by setting Tag=$E_{K1}$(Checksum⊕Y[m]) ⊕Z[0]. The complete ciphertext specifies C[0], ciphertext core C=C[1] . . . C[m], and authentication tag Tag.

Decryption proceeds by the natural algorithm, as will be understood by those skilled in the art to which the present invention pertains, rejecting the ciphertext if the supplied authentication tag does not have the anticipated value.

We now describe the main process of IAPM, as show in the right-hand side of FIG. 7. Having used the key K2 and the nonce R to derive offsets Z[0], . . . , Z[m+1], encipher R, now using key K1, to determine an enciphered R-value, C[0]=$E_{K1}$(R). Now, for each i∈[1 . . . m], message block M[i] is xored with offset Z[i], the result is enciphered using E (keyed by K1), and the resulting block is xored once again with offset Z[i], yielding a ciphertext block C[i]: that is, for each i∈[1 . . . m], let C[i]=Z[i]⊕$E_{K1}$(M[i]⊕Z[i]). Call C=C[1] . . . C[m] the ciphertext core. Next, compute a checksum, Checksum, by xoring together the message blocks: Checksum=M[1]⊕ . . . ⊕M[m]. Next, form an authentication tag, Tag, by xoring the checksum with offset Z[m+1], enciphering the result with $E_{K1}$, and xoring the resulting block with offset Z[0]: Tag=Z[0]⊕$E_{K1}$(Checksum⊕Z[m+1]). The complete ciphertext specifies C[0], ciphertext core C=C[1] . . . C[m], and authentication tag Tag.

Decryption proceeds by the natural algorithm, rejecting a ciphertext if its supplied authentication tag does not have the anticipated value. Namely, set R=$E_{K1}^{-1}$(C[0]) and use R and K2 to compute the offset sequence Z[0], . . . , Z[m+1]. Then compute the prospective plaintext M'=M[1] . . . M[m] by setting M[i]=Z[i]⊕$E_{K1}^{-1}$(C[i]⊕Z[i]). Next, re-compute the tag Tag' that one would expect for the prospective plaintext M': Checksum=M[1]⊕ . . . ⊕M[m] and Tag'=Z[0]⊕$E_{K1}$(Checksum⊕Z[m+1]). If the expected tag, Tag', matches the tag Tag appearing within the ciphertext, then the plaintext M is defined as the prospective plaintext M'. Otherwise, the received ciphertext is invalid.

It should be noted that IACBC is not parallelizable: one can not compute Y[i] until Y[i−1] has already been computed, making that method inherently sequential. But IAPM is fully parallelizable: all of the block-cipher calls needed to compute the ciphertext core can be computed at the same time.

We comment that the nonce R used in IACBC must be random. Use of a counter, or another adversarially predictable value, will result in an incorrect scheme.

It is important to optimize the speed of the make-offset process because, if it is slow, then the entire encryption process will be slow. Jutla's "method 1" for making offsets is depicted in FIG. 8. It works as follows. Let t be the number of bits needed to write m+2 in binary; that is, $$t=1+\lfloor \log_2(m+2) \rfloor.$$

Now for each i∈[1 ... t], let $$IV[i]=E_{K2}(R+i)$$

where the indicated addition operation means computer addition of n-bit strings (that is, regard i as an n-bit string and add it to the n-bit string R, ignoring any carry that might be generated). The value R should be a random value (a counter, for example, will not work correctly). Offsets are now formed by xoring together different combinations of IV[i]-values. Jutla suggests the following to compute each Z[i] value, for i∈[0 ... m+1]. Number bit positions left-to-right by 1, ..., t and let $i_1, ..., i_t \in [1 ... t]$ denote all of the bit positions where i+1, when written as a t-bit binary number, has a 1-bit. Then set $$Z[i]=IV[i_1] \oplus ... \oplus IV[i_s]$$

As an example, if m=3 then t=3 (since 5 is 101 in binary, which takes 3 bits to write down), Z[0]=IV[3] (since 1 is 001 in binary), Z[1]=IV[2] (since 2 is 010 in binary), Z[2]=IV[2]⊕IV[3] (since 3 is 011 in binary), Z[3]=IV[1] (since 4 is 100 in binary), and Z[4]=IV[1]⊕IV[3] (since 5 is 101 in binary).

We now describe Jutla's "method 2" for making offsets. Choose a large prime number p just less than $2^n$ (e.g., choose the largest prime less than $2^n$) and then, for i∈[0 ... m+1], set $$Z[i]=(IV[1]+i \cdot IV[2]) \bmod p$$

where $IV[1]=E_{K2}(R+1)$ and $IV[2]=E_{K2}(R+2)$ are defined as before. Again, nonce R should be a random value. The multiplication operator "·" refers to ordinary multiplication in the integers. Notice that for i≦1, the value of Z[i] can be computed from Z[i−1] by addition of IV[2], modulo p. This second method of Jutla's requires fewer block-cipher calls than the first method of Jutla's (block-cipher calls are used to make the IV[i] values, and now only two such values are needed, regardless of the length of the message). On the other hand, the mod p addition is likely more expensive than xor.

The property that Jutla demands of the sequence of offsets he calls pairwise independence, but Jutla does not use this term in accordance with its customary meaning in probability theory. Jutla appears to mean the property usually called strongly universal-2. A family of random variables Z[0], Z[1], Z[2], ..., each with range D, is said to be strongly universal-2 if, for all i≠j, the random variable (Z[i], Z[j]) is uniformly distributed D×D.

Just subsequent to the appearance of Jutla's paper, two other authors, Virgil Gligor and Pompiliu Donescu, described another authenticated-encryption scheme. Their paper, dated Aug. 18, 2000 and entitled, http://www.eng.umd.edu/~gligorFast Encryption and Authentication. XCBC encryption and XECB Authentication Modes, first appeared on Gligor's worldwide web homepage. The Gligor-Donescu authenticated-encryption scheme, which the authors call XCBC, resembles Jutla's IACBC. The scheme called XCBC$ is depicted in FIG. 9. The main difference between IACBC and XCBC$ is that the latter uses offsets Z[1], Z[2], ... Z[m+1], which are now defined by: Z[0]=0 and, for i∈[1 ... m+1], Z[i+1]=Z[i−1]+R. The indicated addition means addition of binary strings, modulo $2^n$. Besides this "method 3" to create offsets, one should note that the value of Z[i] is now added (modulo $2^n$) to the block-cipher output, rather than being xored with the block-cipher output. Other differences between the Jutla and Gligor-Donescu schemes will be apparent to those skilled in the relevant art when comparing FIGS. 5 and 8.

As with Jutla's schemes, the nonce R in XCBC$ should be a random value; use of a counter, or another adversarially-predictable quantity, will not work correctly. The authors give a closely related scheme, XCBC, which employs a counter instead of a random value. That scheme is illustrated in FIG. 10. The complete ciphertext specifies the nonce, "ctr", as well as C[1] ... C[m]‖Tag.

It should be noted that XCBC and XCBC$, like IACBC, are sequential. Gligor's paper, as it originally appeared, did not suggest a parallelizable approach for authenticated encryption.

All of the available authenticated-encryption schemes we have described thus far share the following limitation: they assume that all messages to be encrypted have a length that is a positive multiple of the block length n. This restriction can be removed by first padding the message, using padding techniques well-known in the art. For example, one can append to every message M a "1" bit and then append the minimum number of 0-bits so that the padded message has a length which is a multiple of n. We call this "obligatory padding". Decryption removes the obligatory padding to recover the original message. However, removing the length restriction in an authenticated-encryption scheme by obligatory padding is undesirable because it increases the length of the ciphertext (by an amount between 1 and n-1 bits). Furthermore, the method results in an extra block-cipher invocation when the message M is of a length already a positive multiple of n.

Another approach known in the art to deal with messages whose length is not a positive multiple of n is "ciphertext stealing CBC encryption", which is like ordinary CBC encryption except that the final message block M[m] may have fewer than n bits and the final ciphertext block C[m] is defined not by C[m]=$E_K$(M[m]⊕C[m−1]) but by C[m]=$E_K$(C[m−1])⊕M[m]. One could hope to somehow use ciphertext stealing in an authenticated-encryption scheme, but it is not known how to do this in a way that does not destroy the authenticity property required of an authenticated-encryption scheme. In particular, natural attempts to try to modify IAPM in a manner that employs ciphertext stealing result in flawed schemes. A possible approach is to adapt ideas from the paper of Black and Rogaway, *CBC MACs for Arbitrary-Length Messages: The Three Key Constructions*, appearing in *Advances in Cryptology—CRYPTO '00*, Lecture Notes in Computer Science, Springer-Verlag, 2000. This paper teaches the use of obligatory padding for messages of length zero or a non-multiple of n, combined with no padding for messages of length of positive multiple of n, combined with xoring into the last block one of two different keys, as a way to differentiate these two different cases. However, such a method is tailored to the construction of message authentication codes, particularly message authentication codes based on the CBC MAC. It is unknown if such methods can be correctly adapted to an authenticated-encryption scheme like IAPM.

An additional limitation of the authenticated-encryption techniques we have discussed is the use of multiple keys. While well-known key-separation techniques can create as many "key variants" as one needs from a single underlying key, depending on such methods results in additional time for key-setup and additional space for key storage. It is unknown how one could devise a correct algorithm that would use only a single block-cipher key and use this one key to key all block-cipher invocations.

Method 1 for computing offsets is complex and slow, needing an unbounded number of block-cipher calls. The values IV[1], ..., IV[t] can be computed during a pre-processing stage, but this pre-processing will be slow. Method 2 for computing offsets requires modulo p addition, which is not particularly fast because typical implementations use blocks having n=128 bits. Method 3 for computing offsets likewise requires addition (now modulo $2^n$) of quantities typically having n=128 bits, which may again be inconvenient because computers do not generally support such an operation, and high-level programming languages do not give access to the add-with-carry instruction that best helps to implement it. Most of the methods we have described require the use of a random nonce R, and the schemes will not work correctly should R be predictable by an adversary.

SUMMARY

Variations of the present invention provide methods for constructing more efficient authenticated-encryption schemes. The new methods give rise to parallelizable authenticated-encryption schemes that combine any or all of the following features: (1) Messages of arbitrary bit length (not necessarily a multiple of the block length n) can be encrypted. (2) The resulting ciphertext will be as short as possible (in particular, the ciphertext core will have the same length as the message that is being encrypted, even when the message length is not a multiple of the block length). (3) Offsets can be computed by extremely fast and simple means, and without the use of modular addition. (4) Pre-processing costs are very low (e.g., one block-cipher call and some shifts and xors). (5) The encryption key is a single block-cipher key, and all block-cipher calls make use of only this one key. (6) The needed nonce may be adversarially predictable (a counter is fine). (7) Only as many offsets are needed as the message is long (in blocks). (8) A total of m+2, (or even m+1) block-cipher calls are adequate to encrypt a message of m blocks.

To achieve these and other goals, new techniques have been developed. A first set of techniques concern the "structure" of an authenticated-encryption scheme, and describe improved methods for how the message M is partitioned into pieces and how these pieces are then processed. A second set of techniques concern improved ways to generate the needed offsets. A third set of techniques deal with methods to avoid the use of multiple block-cipher keys. A fourth set of techniques facilitate authenticated-encryption schemes which efficiently process associated-data, where associated-data refers to information which should be authenticated by the Receiver but which is not a part of the message that is being encrypted. The different types of improvements are largely orthogonal.

More specifically, one embodiment of the present invention provides an authenticated-encryption system that uses a key and a nonce to encrypt a message into a ciphertext. The system operates by partitioning the message into a message body comprising a sequence of n-bit message blocks, and a message fragment of at most n bits. Next, the system generates a sequence of offsets from the nonce and the key. The system then computes a ciphertext body using a block cipher, the message body, the key, the nonce, and the sequence of offsets. The system also computes a ciphertext fragment using the block cipher, the message fragment, the key, and an offset. The system additionally computes a tag as a function of the message body, the message fragment, the sequence of offsets, and the key. The ciphertext is defined to include the ciphertext body, the ciphertext fragment, and the tag.

In one embodiment of the present invention, generating the sequence of offsets involves determining a first offset as a function of the nonce and the key. It also involves determining each subsequent offset by combining a previous offset and a basis offset, wherein each basis offset is determined as a function of the key.

In one embodiment of the present invention, generating the sequence of offsets involves determining an offset by combining a base offset and a fixed offset, wherein the base offset is a function to the key and the nonce, and the fixed offset is a function of the key and a position of the fixed offset in a sequence of fixed offsets.

In one embodiment of the present invention, generating the sequence of offsets involves: generating a sequence of fixed offsets from the key; generating a base offset from the key and the nonce; generating a sequence of translated offsets by combining each fixed offset with the base offset to get a corresponding translated offset; and using the sequence of translated offsets as the sequence of offsets. In a variation on this embodiment, the key determines a sequence of basis offsets and each fixed offset is determined by xoring some combination of basis offsets. In a further variation, each basis offset except for the first basis offset is determined by a shift and a conditional xor applied to a previous basis offset. In yet a further variation, the order that basis offsets are combined into fixed offsets is determined according to a Gray code.

In one embodiment of the present invention, generating the sequence of offsets involves: computing a sequence of basis offsets from the key; computing a base offset from the key and the nonce; and computing a sequence of translated offsets, wherein the first offset is determined from the base offset, the key, and the nonce, and subsequent offsets are determined by combining the prior translated offset with a basis offset.

In one embodiment of the present invention, generating the sequence of offsets involves: computing a key-variant offset by enciphering a constant with the block cipher, wherein the block cipher is keyed by a given key; and computing the sequence of offsets using the key-variant offset.

In one embodiment of the present invention, computing the ciphertext body involves: combining each message block in the message body with a corresponding offset to produce a corresponding input block; applying the block cipher to each input block to produce a corresponding output block; and combining each output block with a corresponding offset to produce a corresponding ciphertext block.

In one embodiment of the present invention, computing the ciphertext fragment involves: computing a precursor pad as a function of an offset; computing a pad by applying the block cipher to the precursor pad; and computing the ciphertext fragment by combining the message fragment and the pad.

In one embodiment of the present invention, computing the tag involves: computing a checksum as a function of the message and a sequence of offsets; and computing the tag as a function of the checksum, the key, and an offset.

In one embodiment of the present invention, computing the tag involves computing a checksum from the message blocks, the message fragment, and a pad; combining the checksum with an offset to produce a precursor full tag;

computing a full tag by applying the block cipher to the precursor full tag; and computing a tag as a portion of the full tag.

One embodiment of the present invention provides a system that uses a key and a nonce to decrypt a ciphertext into a message. The system operates by partitioning the ciphertext into a ciphertext body including a sequence of n-bit ciphertext blocks, a ciphertext fragment of at most n bits, and a tag. Next, the system generates a sequence of offsets from the nonce and the key. The system then computes a message body using a block cipher, the ciphertext body, the key, the nonce, and the sequence of offsets. The system also computes a message fragment using the block cipher, the ciphertext fragment, the key, and an offset. The system additionally computes a new tag as a function of the message body, and then compares the new tag with the tag. If the new tag matches the tag, the system returns the message, wherein the message includes the message body and the message fragment. Otherwise, if the new tag does not match the tag, the system returns a message invalid signal.

DETAILED DESCRIPTION

Figure 1:
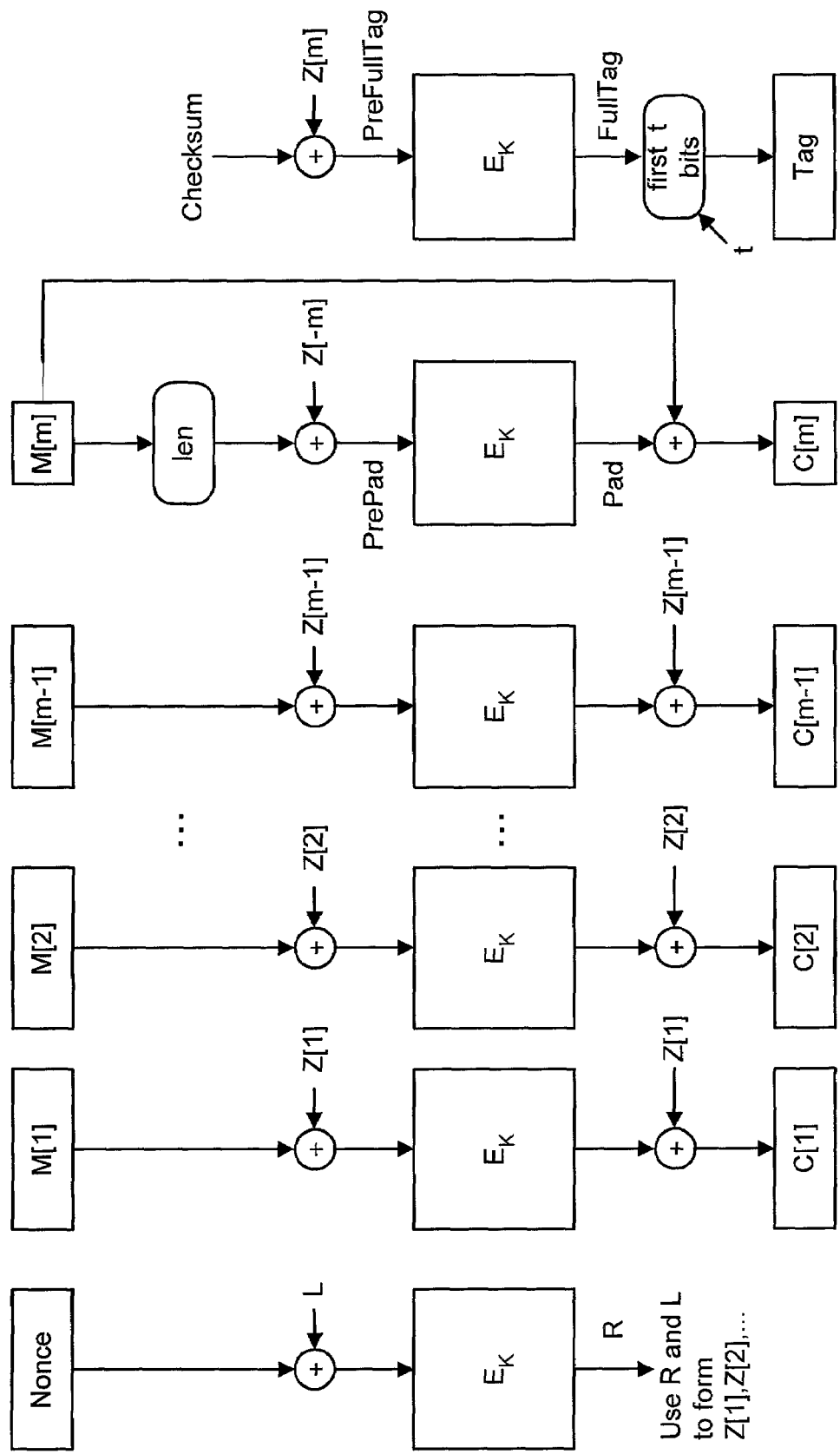
FIG. 1 describes encryption under "OCB", where OCB is the name for one embodiment of many of the techniques taught in the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

We now describe an embodiment of the present invention known as OCB (for offset codebook) mode. OCB is an authenticated-encryption scheme that uses an n-bit block cipher E, a key K, and a nonce Nonce to encrypt an arbitrary message M. To specify OCB we begin by giving some notation and reviewing some mathematical background.

Notation and Mathematical Background

If a and b are integers, $a \leq b$, then [a . . . b] is the set of all integers between and including a and b. If $i \geq 1$ is an integer then ntz(i) is the number of trailing 0-bits in the binary representation of i (equivalently, ntz(i) is the largest integer z such that $2^z$ divides i). So, for example, ntz(7)=0 and ntz(8)=3.

A string is a finite sequence of symbols, each symbol being 0 or 1. The string of length 0 is called the empty string and is denoted $\epsilon$. Let $\{0,1\}^*$ denote the set of all strings. If A, $B \in \{0,1\}^*$ then A B, or A∥B, is their concatenation. If $A \in \{0,1\}^*$ and $A \neq \epsilon$ then firstbit(A) is the first bit of A and lastbit(A) is the last bit of A. Let i and n be nonnegative integers. Then $0^i$ and $1^i$ denote strings of i 0's and 1's, respectively. For n understood, 0 means $0^n$. Let $\{0,1\}^n$ denote the set of all strings of length n. If $A \in \{0,1\}^*$ then |A| is the length of A, in bits, while $|A|_n = \max(1, \lceil |A|/n \rceil)$ is the length of A in n-bit blocks, where the empty string counts as one block. For $A \in \{0,1\}^*$ and $|A| \leq n$, $zpad_n(A)$ is $A \| 0^{n-|A|}$. With n understood we write A0* for $zpad_n(A)$. If $A \in \{0,1\}^*$ and $t \in [0 . . . |A|]$ then A[first t bits] and A[last t bits] are the first t bits of A and the last t bits of A, respectively. Both of these values are the empty string if t=0. If A, $B \in \{0,1\}^*$ then A⊕B is the bitwise xor of A[first s bits] and B[first s bits] where s=min{|A|,|B|}; for example, 1001⊕110=010.

If $A = a_{n-1} . . . a_1 a_0 \in \{0,1\}^n$ is a string, each $a_i \in \{0,1\}$, then str2num(A) is the number $\Sigma_{0 \leq i \leq n-1} 2^i a_i$ that this string represents, in binary. If $a \in [0 . . . 2^{n-1}]$ is a number, then $num2str_n(a)$ is the n-bit string A such that str2num(A)=a. Let $len_n(A) = num2str_n(|A|)$ be the string that encodes the length of A as an n-bit string. We omit the subscript n when it is understood.

If $A = a_{n-1} a_{n-2} . . . a_1 a_0 \in \{0,1\}^n$ then $A << 1 = a_{n-2} . . . a_1 a_0 0$ is the n-bit string which is a left shift of A by 1 bit (the first bit of A disappearing and a zero coming into the last bit), while $A >> 1 = 0 a_{n-1} a_{n-2} . . . a_1$ is the n-bit string which is a right shift of A by one bit (the last bit disappearing and a zero coming into the first bit).

In pseudocode we write "Partition M into M[1] . . . M[m]" as shorthand for "Let $m = |M|_n$ and let M[1], . . . , M[m] be strings such that M[1] . . . M[m]=M and |M[i]|=n for $1 \leq i < m$." We write "Partition C into C[1] . . . C[m] T" as shorthand for "if |C|<t then return invalid. Otherwise, let C=C[first|C|-t bits], let T=C[last t bits], let $m=|C|_n$, and let C[1] . . . C[m] be strings such that C[1] . . . C[m]=C and |C[i]|=n for $1 \leq i < m$." Recall that $|M|_n = \max\{1, \lceil |M|/n \rceil\}$, so the empty string partitions into m=1 blocks, that one block being the empty string.

By way of mathematical background, recall that a finite field is a finite set together with an addition operation and a multiplication operation, each defined to take a pair of points in the field to another point in the field. The operations must obey certain basic axioms defined by the art. (For example, there must be a point 0 in the field such that a+0=0+a=a for every a; there must be a point 1 in the field such that a·1=1·a=a for every a; and for every $a \neq 0$ there must be a point $a^{-1}$ in the field such that $a \cdot a^{-1} = a^{-1} \cdot a = 1$.) For each number n there is a unique finite field (up to the naming of the points) that has $2^n$ elements. It is called the Galois field of size $2^n$, and it is denoted $GF(2^n)$.

We interchangeably think of a point $a \in GF(2^n)$ in any of the following ways: (1) as an abstract point in a field; (2) as an n-bit string $a_{n-1} \ldots a_1 a_0 \in \{0,1\}^n$; (3) as a formal polynomial $a(x) = a_{n-1}x^{n-1} + \ldots + a_1x + a_0$ with binary coefficients; (4) as a nonnegative integer between 0 and $2^{n-1}$, where the string $a \in \{0,1\}^n$ corresponds to the number str2num(a). For example, one can regard the string $a = 0^{125}101$ as a 128-bit string, as the number 5, as the polynomial $x^2+1$, or as a particular point in the finite field $GF(2^{128})$. We write a(x) instead of a if we wish to emphasize the view of a as a polynomial in the formal variable x.

To add two points in $GF(2^n)$, take their bitwise xor. We denote this operation by $a \oplus b$.

Before we can say how to multiply two points we must fix some irreducible polynomial $poly_n(x)$ having binary coefficients and degree n. For OCB, choose the lexicographically first polynomial among the irreducible degree-n polynomials having a minimum number of coefficients. For n=128, the indicated polynomial is $poly_{128}(x) = x^{128} + x^7 + x^2 + x + 1$.

To multiply points a, $b \in GF(2^n)$, which we denote $a \cdot b$, regard a and b as polynomials a(x) and b(x), form their product polynomial c(x) (where one adds and multiplies coefficients in GF(2)), and take the remainder one gets when dividing c(x) by the polynomial $poly_n(x)$. By convention, the multiplication operator has higher precedence than addition operator and so, for example, $\gamma_1 \cdot L \oplus R$ means $(\gamma_1 \cdot L) \oplus R$.

It is particularly easy to multiply a point $a \in \{0,1\}^n$ by x. We illustrate the method for n=128, where $poly_n(x) = x^{128} + x^7 + x^2 + x + 1$. Then multiplying $a = a_{n-1} \ldots a_1 a_0$ by x yields the polynomial $a_{n-1}x^n + a_{n-2}x^{n-1} + a_1x^2 + a_0x$. Thus, if the first bit of a is 0, then $a \cdot x = a << 1$. If the first bit of a is 1 then we must add $x^{128}$ to $a << 1$. Since $x^{128} + x^7 + x^2 + 1 = 0$ we know that $x^{128} = x^7 + x^2 + 1$, so adding $x^{128}$ means to xor by $0^{120}10000111$. In summary, when n=128, $$a \cdot x = \begin{cases} a \ll 1 & \text{if firstbit}(a) = 0, \text{ and} \\ (a \ll 1) \oplus 0^{120}10000111 & \text{if firstbit}(a) = 1 \end{cases}$$

If $a \in \{0,1\}^n$ then we can divide a by x, meaning that one multiplies a by the multiplicative inverse of x in the field: $a \cdot x^{-1}$. It is easy to compute $a \cdot x^{-1}$. To illustrate, again assume that n=128. Then if the last bit of a is 0, then $a \cdot x^{-1}$ is $a >> 1$. If the last bit of a is 1, we must add (xor) to $a >> 1$ the value $x^{-1}$. Since $x^{128} = x^7 + x^2 + x + 1$ we have $x^{127} = x^6 + x + 1 + x^{-1}$ and so $x^{-1} = x^{127} + x^6 + x + 1 = 10^{120}1000011$. In summary, for n=128, $$a \cdot x^{-1} = \begin{cases} a \gg 1 & \text{if lastbit}(a) = 0, \text{ and} \\ (a \gg 1) \oplus 10^{120}1000011 & \text{if lastbit}(a) = 1 \end{cases}$$

If $L \in \{0,1\}^n$ and $i \geq -1$, we write L(i) for $L \cdot x^i$. There is an easy way to compute $L(-1), L(0), L(1), \ldots, L(u)$, for a small number u. Namely, set $L(0) = L$; compute $L(i) = L(i-1) \cdot x$ from $L(i-1)$, for all $i \in [1 \ldots u]$, using a shift and a conditional xor (with the formula we have given); and compute $L(-1)$ from L by a shift and a conditional xor (with the formula we have given).

Still by way of background, a Gray code is an ordering of the points of $\{0,1\}^s$ (for some number s) such that successive points differ (in the Hamming sense) by just one bit. For n a fixed number, like n=128, OCB uses the canonical Gray code $Gray(n) = (\gamma_0, \gamma_1, \ldots, \gamma_{2^n-1})$. Gray(n) is defined as follows: Gray(1)=(0, 1) and Gray(s) is constructed from Gray(s−1) by first listing the strings of Gray(s−1) in order, each preceded by a 0-bit, and then listing the strings of Gray(s−1) in reverse order, each preceded by a 1 bit. It is easy to see that Gray(n) is a Gray code. What is more, $\gamma_i$ can be obtained from $\gamma_{i-1}$ by xoring $\gamma_{i-1}$ with $0^{n-1}1 \ll ntz(i)$. This makes successive strings easy to compute.

As an example, Gray(128)=(0,1,3,2,6,7,5,4, . . . ). To see this, start with (0, 1). Then write it once forward and once backwards, (0,1,1,0). Then write (00, 01, 11, 10). Then write it once forward and once backwards, (00,01,11,10, 10,11, 01,00). Then write (000,001,011,010, 110,111,101,100). At this point we already know the first 8 strings of Gray(128), which are (0,1,3,2,6,7,5,4), where these numbers are understood to represent 128-bit strings. So, for example, $\gamma_5$ is 7 and $\gamma_6$ is 5, and $\gamma_6 = 5$ really is $\gamma_5 = 7$ xored with 2, where 2 is the string 1 shifted left ntz(6)=1 positions.

Let $L \in \{0, 1\}^n$ and consider the problem of successively forming the strings $\gamma_1 \cdot L, \gamma_2 \cdot L, \gamma_3 \cdot L, \ldots, \gamma_m \cdot L$. Of course $\gamma_1 \cdot L = 1 \cdot L = L$. Now, for $i \geq 2$, assume one has already computed $\gamma_{i-1} \cdot L$. Since $\gamma_i = \gamma_{i-1} \oplus (0^{n-1}1 \ll ntz(i))$ we know that $$\gamma_i \cdot L = (\gamma_{i-1} \oplus (0^{n-1}1 \ll ntz(i)) \cdot L$$

$$= \gamma_{i-1} \cdot L \oplus (0^{n-1}1 \ll ntz(i)) \cdot L$$

$$= \gamma_{i-1} \cdot L \oplus (L \cdot x^{ntz(i)})$$

$$= \gamma_{i-1} \cdot L \oplus L(ntz(i))$$

That is, the i-th string in the sequence is obtained by xoring the previous string in the sequence with L(ntz(i)).

Had the sequence we were considering been additively offset by some value R, that is, $R \oplus \gamma_i \cdot L, R \oplus \gamma_2 \cdot L, \ldots, R \oplus \gamma_m \cdot L$, the i-th string in the sequence would be formed in the same way, for $i \geq 2$, but the first string in the sequence would be $L \oplus R$ instead of L.

Definition of OCB

With the necessary notation and background now in place, we are ready to describe OCB. OCB depends on two parameters: a block cipher E, having block length n, and a tag length t, where t is a number between 1 and n. By trivial means, the adversary will be able to forge a valid ciphertext with probability $2^{-t}$.

A popular block cipher to use with OCB is likely to be the AES algorithm (AES-128, AES-192, or AES-256). As for the tag length, a suggested default of t=64 is reasonable, but tags of any length are fine.

Encryption under OCB mode requires an n-bit nonce, Nonce. The nonce would typically be a counter (maintained by the sender) or a random value (selected by the sender). Security is maintained even if the adversary can control the nonce, subject to the constraint that no nonce may be repeated within the current session (that is, during the period of use of the current encryption key). The nonce need not be random, unpredictable, or secret.

The nonce Nonce is needed both to encrypt and to decrypt. To permit maximum flexibility, it is not specified by OCB how the nonce is communicated to the Receiver, and we do not regard the nonce as part of the ciphertext. Most often the nonce would be communicated, in the clear, along with the ciphertext: for example, the nonce, in it entirety, might be prepended to the ciphertext. Alternatively, the Sender may encode the nonce using some agreed upon number of bits less than n, and this encoded nonce would be sent to the Receiver along with the ciphertext.

TABLE 1

```
OCB-Encrypt_K (Nonce,M)
Partition M into M[1] ... M[m]             // Define needed values
L = E_K(0)                                 // Key variant. Recall 0=0^n
R = E_K (Nonce ⊕ L)                        // Base offset R
for i = 1 to m                             // Offsets: Z[1],...,Z[m]
    do Z[i] = γ_i · L ⊕ R
Z[-m] = Z[m] ⊕ L · x^{-1}
for i=1 to m-1 do                          // Process message blocks...
    C[i] = E_K(M[i] ⊕ Z[i]) ⊕ Z[i]
PrePad = len(M[m]) ⊕ Z[-m]                 // Process final fragment...
Pad = E_K(PrePad)
C[m] = Pad ⊕ M[m]                          // Uses Pad bits 1..|M[m]|
C = C[1] ... C[m]                          // Ciphertext core
Checksum = M[1] ⊕ ... ⊕ M[m-1] ⊕ C[m] 0* ⊕ Pad
PreFullTag = Checksum ⊕ Z[m]
FullTag = E_K (PreFullTag)
Tag = FullTag [first t bits]
return C ∥ Tag                             // The final ciphertext, C
```

See FIG. 1 for an illustration of OCB encryption. FIG. 1 is best understood in conjunction with the algorithm definition in Table 1, which explains all of the figure's various parts and gives additional algorithmic details. The key space for OCB is the key space for the underlying block cipher E. OCB encryption is then defined in Table 1.

Referring to FIG. 1 and the algorithm definition above, one sees that the message M has been partitioned into n-bit blocks M[1], . . . , M[m-1], as well as a message fragment, M[m], which may have fewer than n bits. The message blocks and the final fragment are treated differently.

Each message block M[i] is xored with an offset (the Z[i] value), enciphered, and then xored again with the same offset. This gives a ciphertext block C[i].

The message fragment M[m] is mapped into a ciphertext fragment C[m] by xoring it with the string Pad. According to our conventions, only the first |M[m]| bits of Pad are used. In this way, C[m], will have the same length as M[m]. The value Pad does not depend on M[m], apart from its length. In particular, Pad is formed by enciphering the string PrePad which is the xor of the length of the final fragment M[m], encoded as a string, and the "special" offset Z[-m], which is the xor of Z[m] and L·x^{-1}. Thus PrePad (and therefore Pad) depends on the bit length of M.

At this point, the ciphertext core C=C[1] . . . C[m] has been computed. Its length is the length of M.

A checksum is now computed by xoring together: (a) the m-1 message blocks; (b) the zero-padded ciphertext fragment, C[m]0*; and (c) the value Pad. (This is equivalent to xoring together: (a) the message blocks; (b') the zero-padded message fragment, M[m]0*; (c') the string S which is the first n-|M[m]| bits of Pad followed by |M[m]| zero-bits.) The checksum is offset using offset Z[m], giving the PreFullTag. That string is enciphered to give the FullTag. The t-bit prefix of the FullTag is used as the actual tag, Tag.

The ciphertext C is the ciphertext core C=C[1] . . . C[m] together with the tag Tag. The Nonce must be communicated along with the ciphertext C to allow the Receiver to decrypt.

Figure 2:
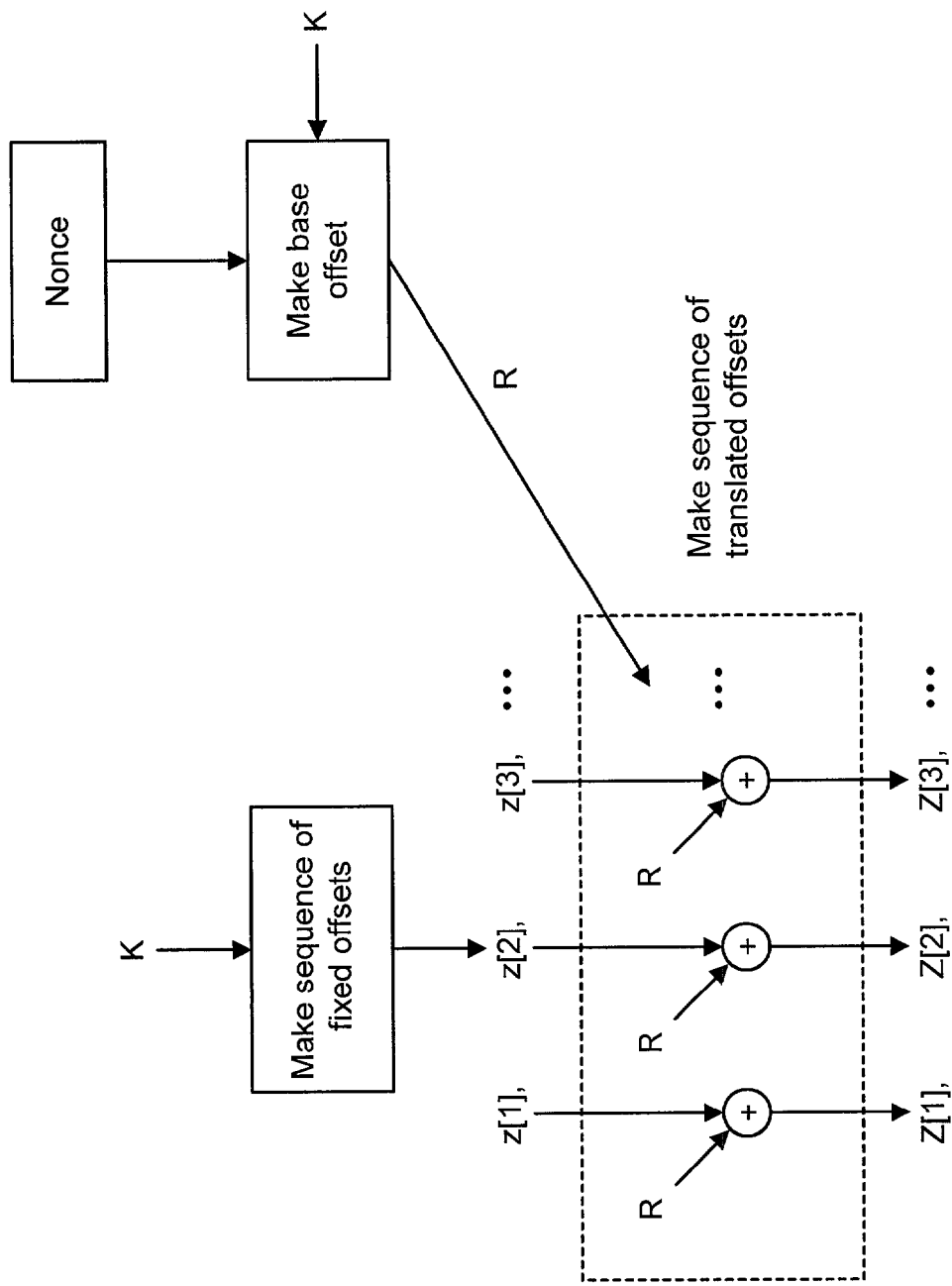
FIG. 2 is a high-level description of the make-offset process of OCB in accordance with an embodiment of the present invention.
Figure 3:
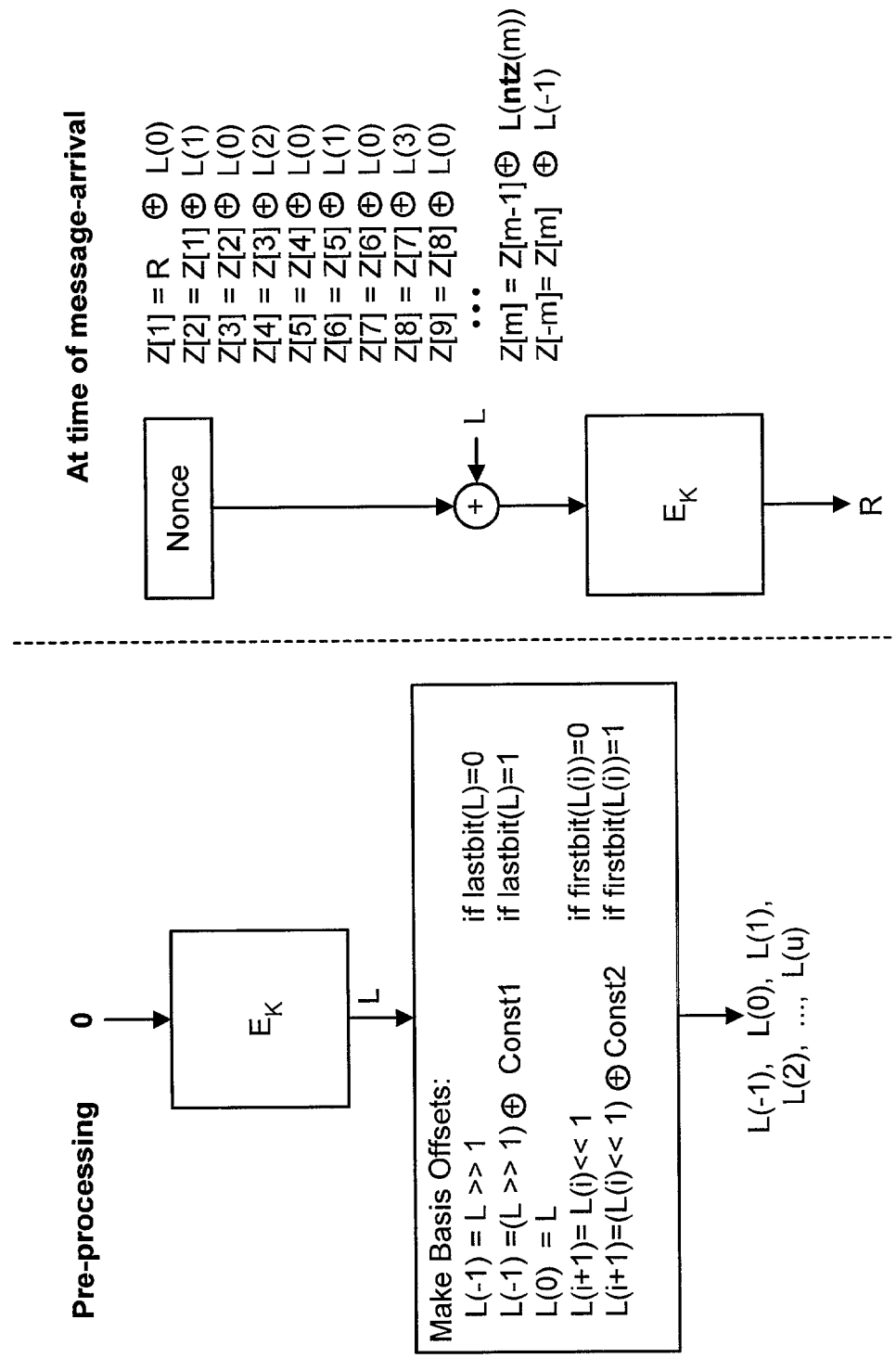
FIG. 3 is a low-level description of the make-offset process of OCB in accordance with an embodiment of the present invention.

FIGS. 2 and 3 clarify the make-offset process that is used in OCB but which is only partially depicted in FIG. 1. First, FIG. 2 depicts how the underlying key K is mapped, conceptually, into a sequence of fixed offsets z[1], z[2], z[3], . . . . We call this sequence of offsets "fixed" because it does not depend on the nonce Nonce (it only depends on the key K). The sequence of fixed offsets is mapped into a sequence of translated offsets, or simply offsets, by xoring each fixed offset with a base offset, R: that is, Z[i]=z[i]⊕R. The base offset R is determined from the nonce Nonce and from the underlying key K.

FIG. 3 shows the inventive process in more detail. The sequence of fixed offsets that we choose is z[1]=γ_1·L, z[2]=γ_2·L, z[3]=γ_3·L, and so on. Thus the sequence of translated offsets used by OCB is Z[1]=γ_1·L⊕R, Z[2]=γ_2·L⊕R, Z[3]=γ_3·L⊕R, and so on. These offsets can be calculated in a particularly simple manner. Namely, in a pre-processing step we map L, which is a key variant determined by enciphering under K the constant string 0, into a sequence of basis offsets L(0), L(1), L(2), . . . . Basis offset L(i) is defined to be L·x^i. We have already explained how to easily compute these strings. Now we compute translated offsets as follows. The first offset, Z[1], is defined as R⊕L(0). Offset Z[2] is computed from offset Z[1] by xoring Z[1] with L(1). One chooses L(1) because we are making offset number 2 and the number 2, written in binary, ends in 1 zero-bit. Offset Z[3] is computed from offset Z[2] by xoring Z[2] with L(0). One chooses L(0) because we are making offset 3 and 3, written in binary, ends in 0 zero-bits. Offset Z[4] is computed from offset Z[3] by xoring into Z[3] with L(2). One chooses L(2) because we are making offset 4 and 4, written in binary, ends in 2 zero-bits. One continues in this way, constructing each (translated) offset from the prior offset by xoring in the appropriate L(i) value.

Figure 4:
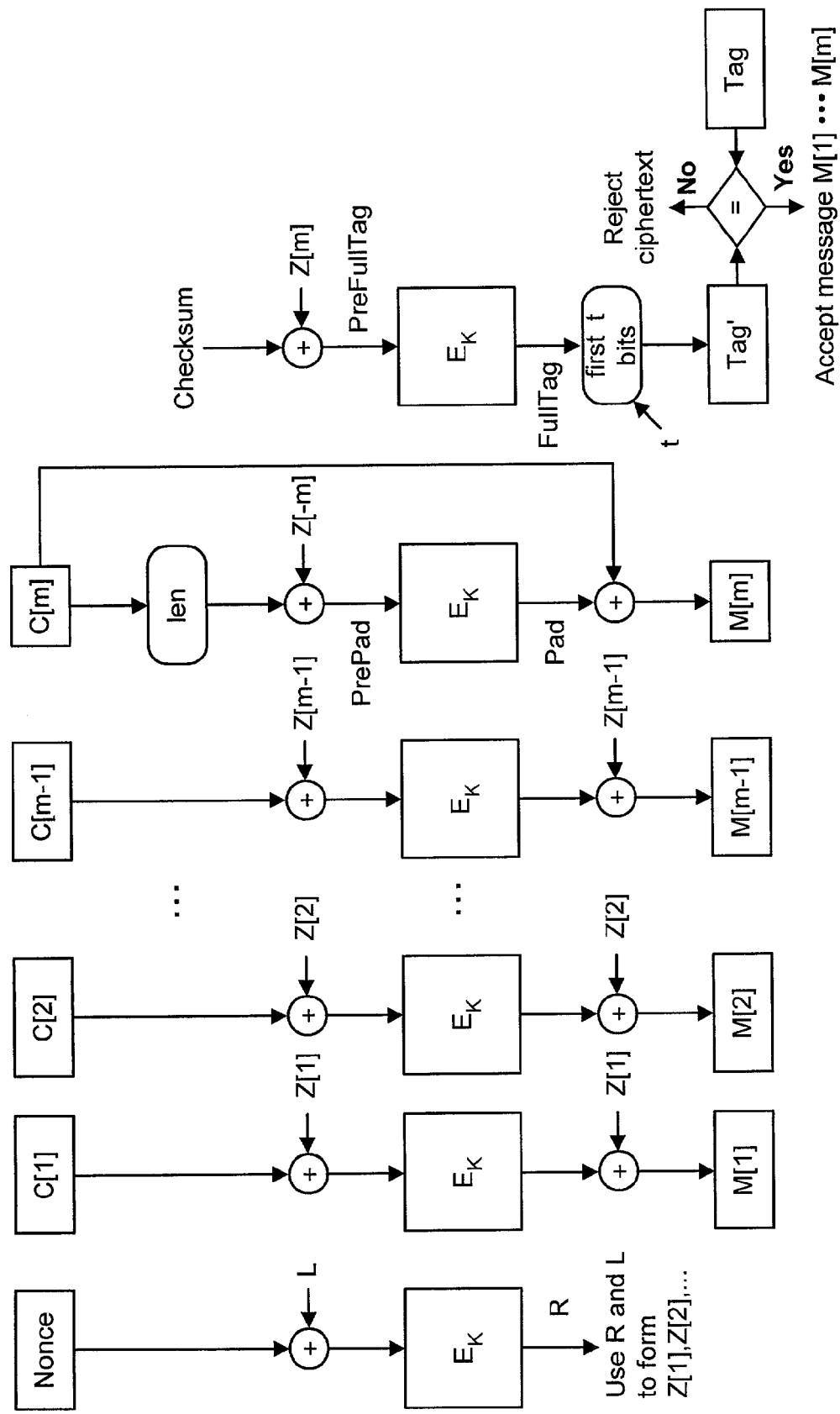
FIG. 4 describes decryption under OCB in accordance with an embodiment of the present invention.

Decryption in OCB works in the expected way. The algorithm is shown in FIG. 4 and is defined as follows. All parts of FIG. 4 can be understood by consulting the algorithm definition that appears in Table 2.

TABLE 2

```
OCB-Decrypt_K (Nonce, C)
Partition C into C[1] ... C[m] T
L = E_K (0)
R = E_K (Nonce ⊕ L)
for i = 1 to m do Z[i] = γ_i · L ⊕ R
Z[-m] = Z[m] ⊕ L · x^{-1}
for i = 1 to m-1 do
    M[i] = E_K^{-1} (C[i] ⊕ Z[i]) ⊕ Z[i]
PrePad = len(C[m]) ⊕ Z[-m]
Pad = E_K(PrePad)
M[m] = Pad ⊕ C[m]
M = M[1] ... M[m]
Checksum = M[1] ⊕ ... ⊕ M[m-1] ⊕ C[m] 0* ⊕ Pad
Tag' = E_K (Checksum ⊕ Z[m]) [first t bits]
if Tag = Tag' then return M
             else return invalid
```

An Alternative Description

At this point, we have fully described the embodiment OCB. Still, the following alternative description may help to clarify what a typical implementation might choose to do.

Key Generation: Choose a random key K from the key space for the block cipher. The key K is provided to both the entity that encrypts and the entity that decrypts.

Key Setup: With the key now distributed, the following can be pre-computed:
1. Setup the block-cipher key. For the party that encrypts: do any key setup associated to enciphering using the block-cipher with key K. For the party that decrypts: do any key setup associated to enciphering or deciphering using the block-cipher with key K.
2. Pre-compute L. Let $L=E_K(0)$.
3. Pre-compute L(i)-values. Let $m_{max}$ be at least as large as the number of n-bit blocks in any message to be encrypted or decrypted. Let $u=\lceil \log_2 m_{max}\rceil$. Let $L(0)=L$ and, for $i \in [1 \ldots u]$, compute $L(i)=L(i-1)\cdot x$ using a shift and a conditional xor, in the manner already described. Compute $L(-1)=L\cdot x^{-1}$ using a shift and a conditional xor, in the manner already described. Save $L(-1), L(0), \ldots, L(u)$ in a table.

Encryption: To encrypt message $M \in \{0,1\}^*$ using key K nonce Nonce$\in \{0,1\}^n$, obtaining ciphertext C, do the following:
1. Partition M. Let $m=\lceil |M|/n \rceil$. If m=0 then replace m by 1. Let $M[1], \ldots, M[m]$ be strings such that $M[1] \ldots M[m]=M$ and $|M[i]|=n$ for all $i \in [1 \ldots m-1]$.
2. Initialize variables. Let Offset=$E_K$(Nonce$\oplus$L). Let Checksum=0.
3. Encipher all blocks but the last one. For i=1 to m-1, do the following:
   Let Checksum=Checksum$\oplus$M[i].
   Let Offset=Offset$\oplus$L(ntz(i)).
   Let C[i]=$E_K$(M[i]$\oplus$Offset)$\oplus$Offset.
4. Mask the final fragment and finish constructing the checksum:
   Let Offset=Offset$\oplus$L(ntz(m)).
   Let Pad=$E_K$(len(M[m])$\oplus$L(-1)$\oplus$Offset).
   Let C[m]=M[m]$\oplus$(the first |M[m]| bits of Pad).
   Let Checksum=Checksum$\oplus$Pad$\oplus$C[m]0*.
5. Form the tag. Let Tag be the first t bits of $E_K$(Checksum$\oplus$Offset).
6. Return the ciphertext. The ciphertext is defined as the string C=C[1]. C[m-1]C[m]‖Tag. It is communicated along with the nonce Nonce to the Receiver.

Decryption: To decrypt a ciphertext $C \in \{0,1\}^*$ using key K and nonce Nonce$\in \{0,1\}^n$, obtaining a plaintext $M \in \{0, 1\}^*$ or else an indication invalid, do the following:
1. Partition the ciphertext. If |C|<t then return invalid (the ciphertext has been rejected). Otherwise, let C be the first |C|-t bits of C and let Tag be the remaining t bits. Let $m=\lceil |C|/n \rceil$. If m=0 then let m=1. Let $C[1], \ldots, C[m]$ be strings such that $C[1] \ldots C[m]=C$ and $|C[i]|=n$ for $i \in [1 \ldots m-1]$.
2. Initialize variables. Let Offset=$E_K$(Nonce$\oplus$L). Let Checksum=0.
3. Recover all blocks but the last one. For i=1 to m-1, do the following:
   Let Offset=Offset$\oplus$L(ntz(i)).
   Let M[i]=$E_{K^{-1}}$(C[i]$\oplus$Offset)$\oplus$Offset.
   Let Checksum=Checksum$\oplus$M[i].
4. Recover the final fragment and finish making the checksum:
   Let Offset=Offset$\oplus$L(ntz(m)).
   Let Pad=$E_K$(len(C[m])$\oplus$l(-1)$\oplus$Offset).
   Let M[m]=C[m]$\oplus$(the first |C[m]| bits of Pad).
   Let Checksum=Checksum$\oplus$Pad$\oplus$C[m]0*.
5. Check the tag. Let Tag' be the first t bits of $E_K$(Checksum$\oplus$Offset). If Tag$\neq$Tag' then return invalid (the ciphertext has been rejected). Otherwise,
6. Return the plaintext. The plaintext that is returned is defined to be $M=M[1] \ldots M[m-1] M[m]$.

Variations

While many variants of OCB result in incorrect algorithms, there are also many correct variants. One type of variant leaves the structure of OCB alone, but changes the way offsets are produced. When changing the way that offsets are produced, one may also have to change the semantics of the xor operation. We give a couple of examples.

For an "addition mod $2^n$ variant" of OCB, one might change the offsets to $Z[i]=(R+iL) \mod 2^n$, for $i \geq 1$, and $Z[-m]$=complement(Z[m]) (the bit-wise complement of Z[m]). According to this definition, each offset is computed from the prior one by n-bit addition of L. Alternatively, replace complement(Z[m])) by $-Z[m] \mod 2^n$, where is nearly the same thing (the two differ by a constant, 1, and this difference is irrelevant).

Assuming n is a multiple of the word size of a computer, addition mod $2^n$ is easily computed by a computer. We call addition mod $2_n$ "computer addition". Computer addition might or might not generate a carry. To achieve addition modulo $2^n$ any carry that is generated is simply ignored.

Alternatively, for $i \geq 1$, one could define $Z[i]=iR \mod 2^n$, so that each offset is obtained from the prior one by n-bit addition of R instead of L.

When defining offsets using computer addition, the xor operations used to combine a message block and an offset, and the xor operations used to combine a block-cipher output and an offset, should be replaced by mod $2^n$ addition. Leaving these operations as xors seems to damage the schemes' security.

For a "mod p variant" of OCB, where p is a large prime number (for example, the smallest prime number less than $2^n$), change the offsets to $Z[i]=(R+iL) \mod p$, for $i \geq 1$, and $Z[-m]$=complement(Z[m]). According to this definition, each offset is computed from the prior one by n-bit addition of L. The complement(Z[m]) can be replaced by $-Z[m] \mod p$, which is nearly the same thing (the two differ by a constant, 1, and this difference is irrelevant).

Alternatively, for $i \geq 1$, one could define $Z[i]=iR \mod p$, so that each offset is obtained from the prior one by n-bit addition of R instead of L.

When defining offsets using addition modulo p, the xor operations used to combine a message block and an offset, and then used to combine a block-cipher output and an offset, could be replaced by mod p addition. However, this does not seem to be essential.

An efficiency improvement can be made to the mod p schemes for offset production: define Z[i] not as (Z[i-1]+L) mod p, where an implementation would always have to check if the sum is p or larger, but by doing the (mod p)-reduction in a "lazy" manner, according to the carry bit produced by computer addition. Namely, form Z[i] by computer addition of n-bit numbers L and Z[i-1]. If the addition generates a carry bit, then add into the sum the number $\delta=2^n-p$. This method results in Z[i] being equal to one of two possible values: (iL+R) mod p, or p+((iL+R) mod p). The latter is only a possibility in (rare) case that the indicated sum is less than $2^n$. Thus the sequence of offsets is not little changed, yet an implementation is more efficient since it only has to make an adjustment to the computer-addition sum when a carry is generated. The carry will typically be computed "for free" in a modern processor. We call this method of offset production lazy mod p addition.

Lazy mod p addition also works as a modification to the $Z[i]=iR \mod p$ method; namely, define $Z[1]=R$ and $Z[i]=(Z[i-1]+R) \mod 2^n$ if the indicated computer addition does not generate a carry, and define $Z[i]=(Z[i-1]+R+\delta) \mod 2^n$ if the first addition does generate a carry.

Other variants of OCB change minor details in the structure of the algorithm. For example, the value $L \cdot x^{-1}$ used in forming the PrePad can be replaced by the value $L>>1$. These two possibilities are nearly the same thing: recall that $L \cdot x^{-1}$ is actually equal to $L>>1$ if L ends in a 0 bit, and, if L ends in a 1 bit, $L \cdot x^{-1}$ differs from $L>>1$ by a fixed constant. Thus there is no practical difference between $L \cdot x^{-1}$ and $L>>1$. This is exactly analogous to the use of $-A \mod p$ verses complement(A) in an addition mod p based scheme; or $-A \mod 2^n$ verses complement(A) in an addition mod $2^n$ based scheme.

More structural changes can be made to OCB while preserving its basic ideas. The intuition for the manner in which OCB processes the final fragment and then produces the tag is to ensure that the PreFullTag appreciably depends not only on the message blocks, but also on (a) the message fragment/ciphertext fragment, and (b) the length of the message. As an example alternative, one might change the $Z[-m]$ offset to $Z[m]$, and change the $Z[m]$ offset to $Z[-m]$.

Figure 5:
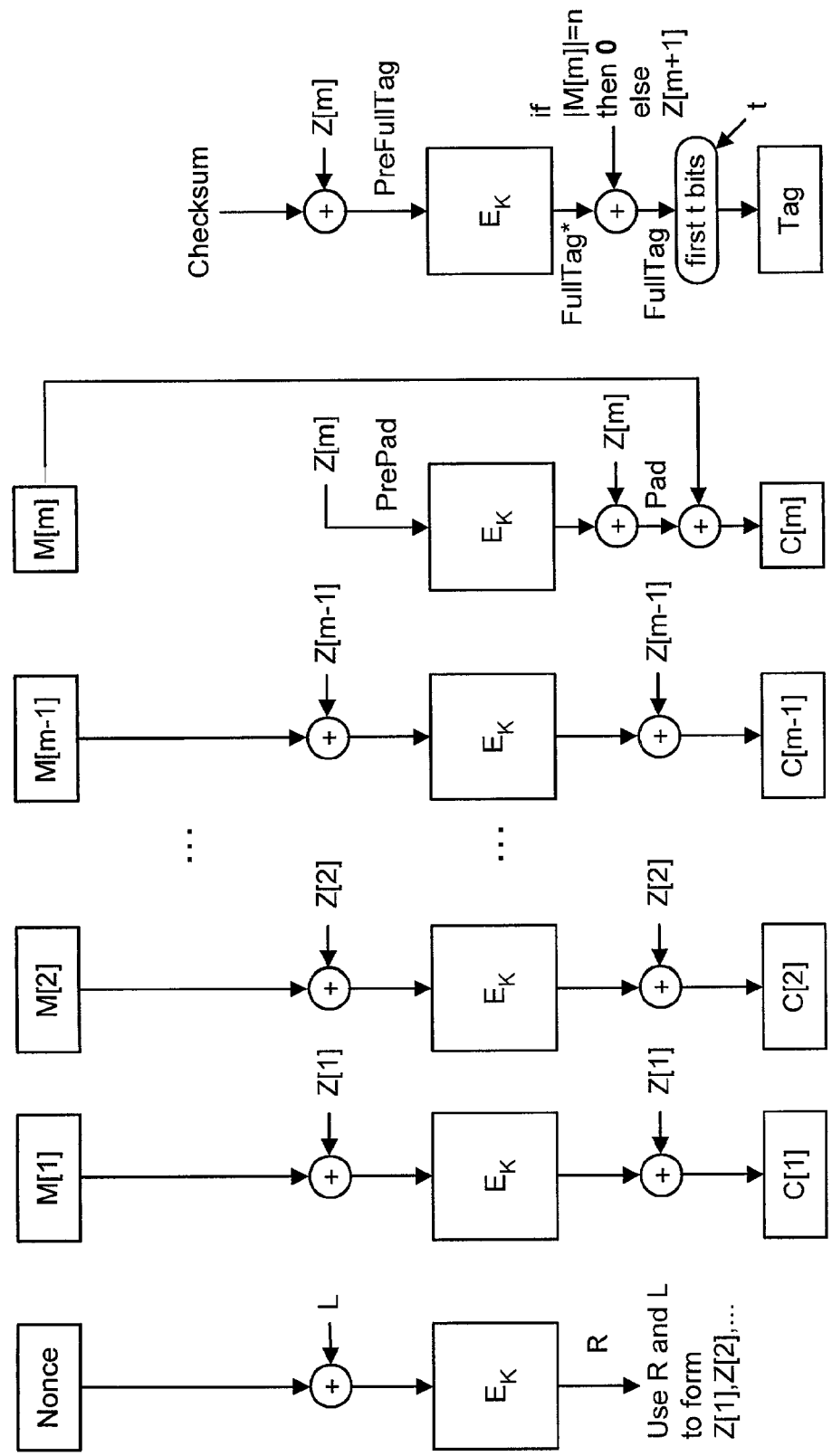
FIG. 5 describes a variant of OCB in accordance with an embodiment of the present invention.
Figure 6:
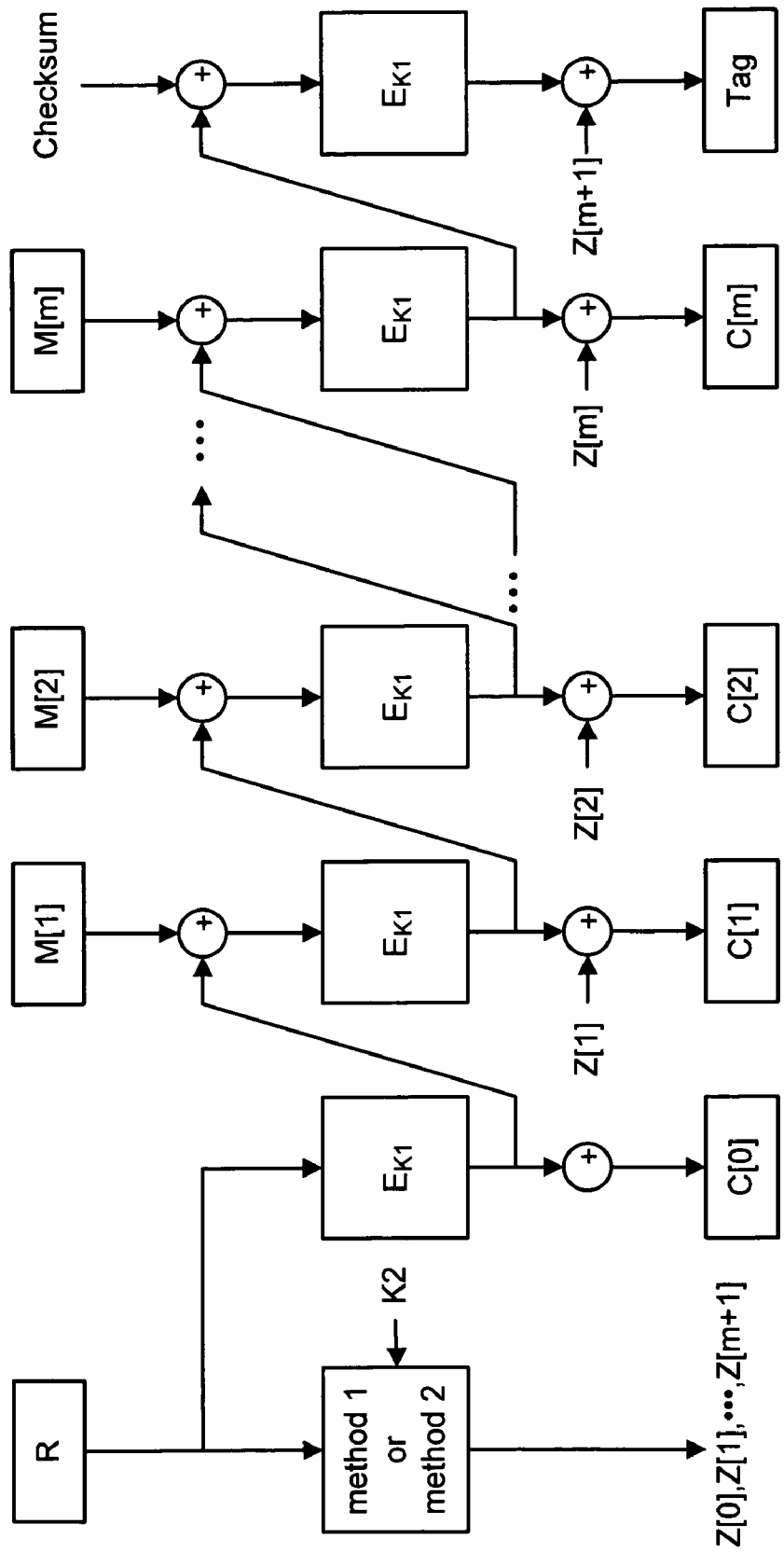
FIG. 6 depicts the IACBC scheme of Jutla.
Figure 7:
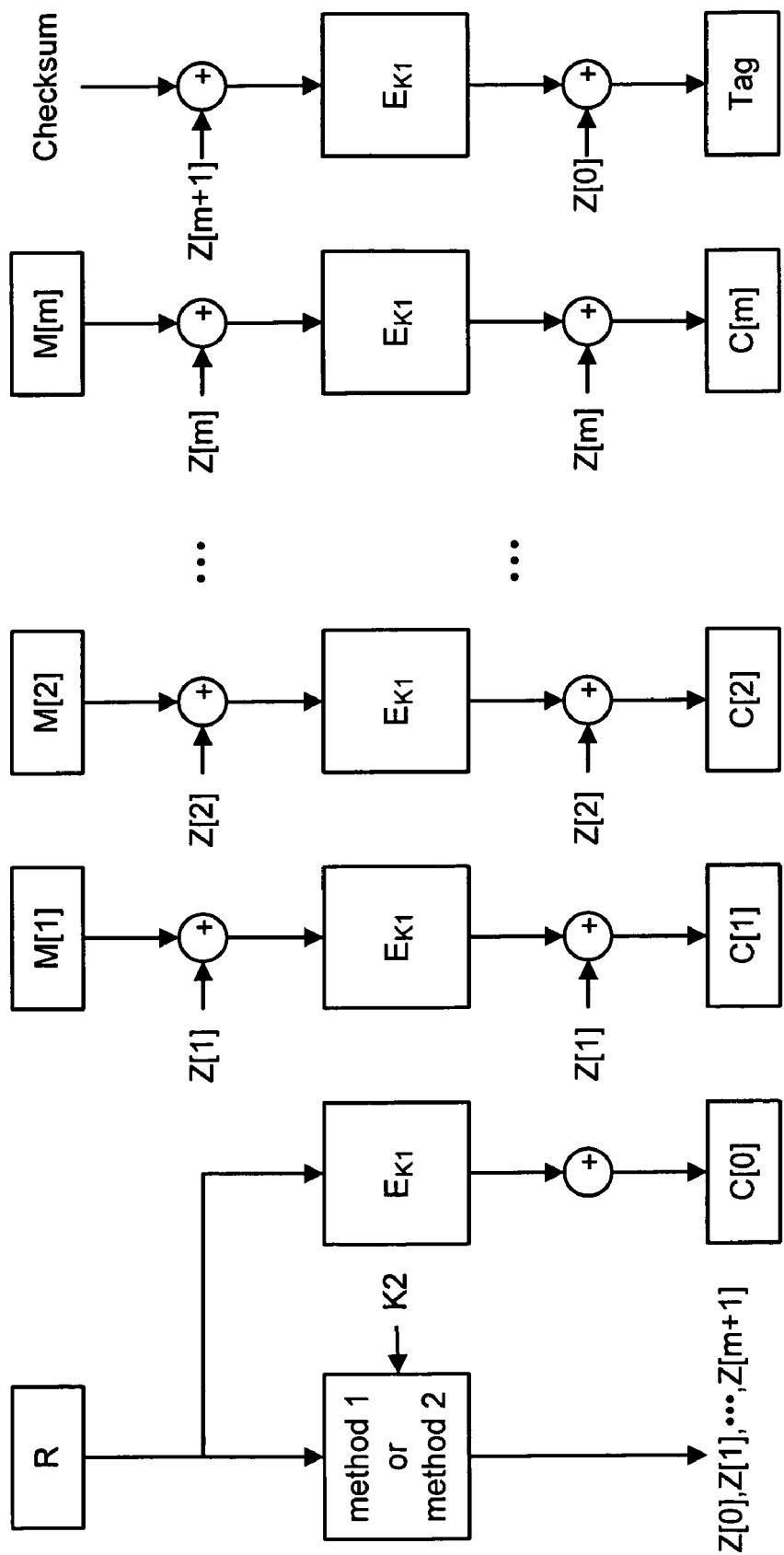
FIG. 7 depicts the IAPM scheme of Jutla.
Figure 8:
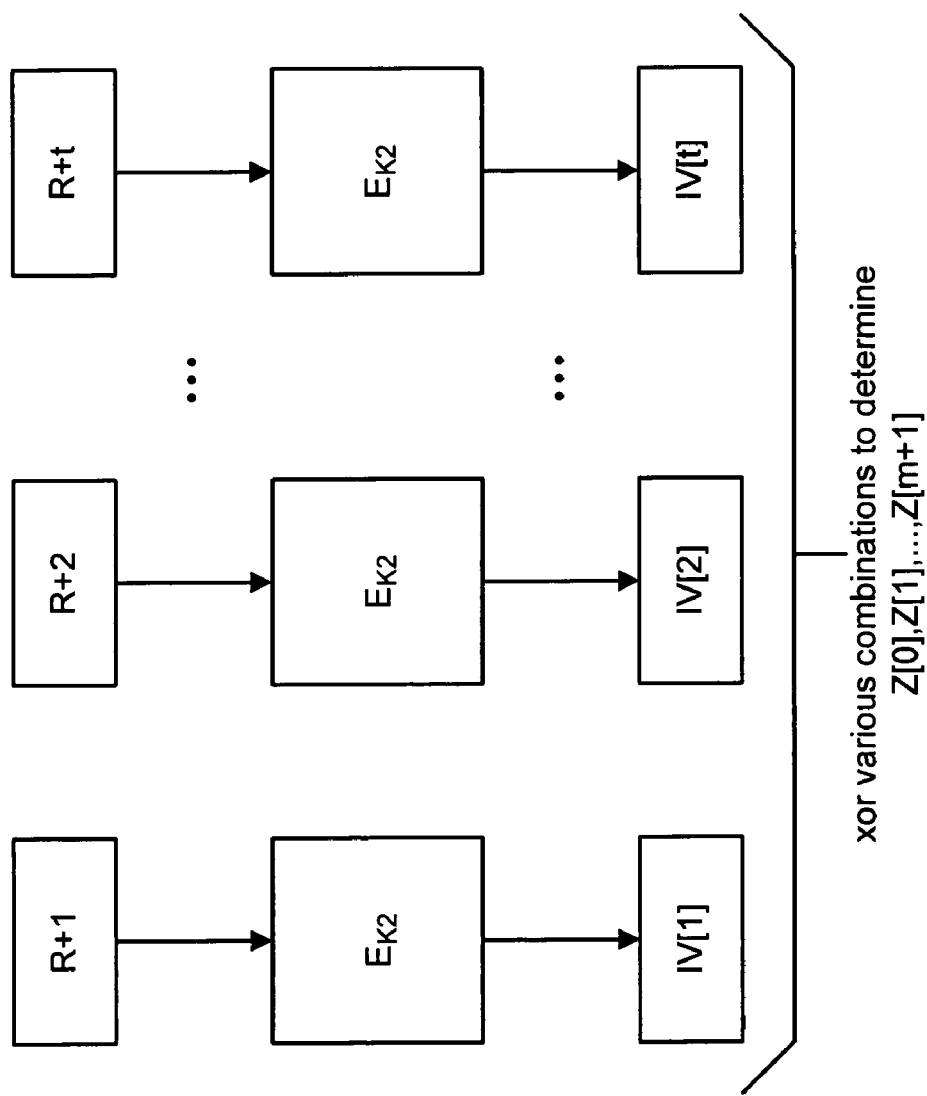
FIG. 8 depicts one of Jutla's methods for constructing offsets.
Figure 9:
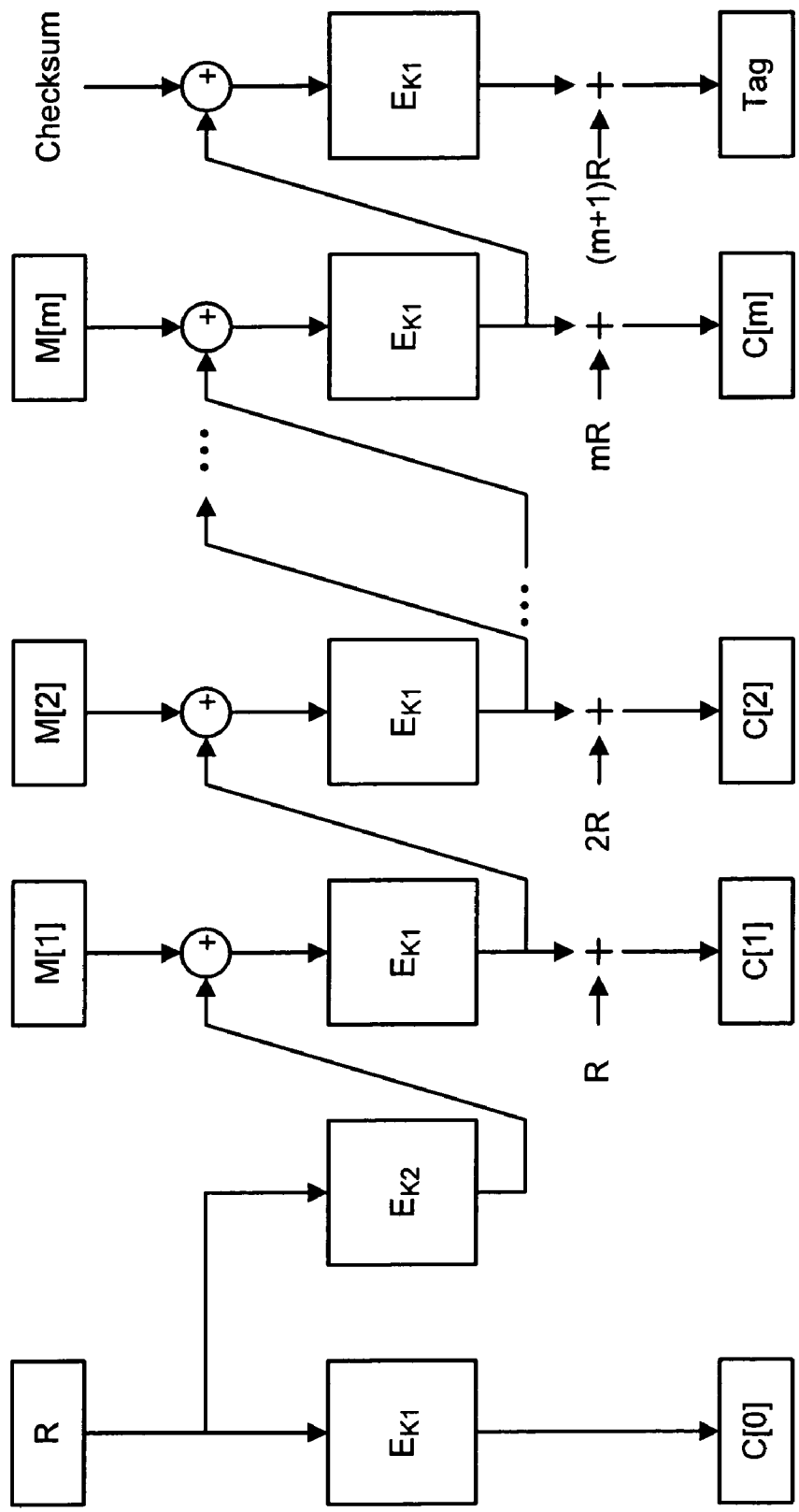
FIG. 9 depicts the XCBC$ scheme of Gligor and Donescu.
Figure 10:
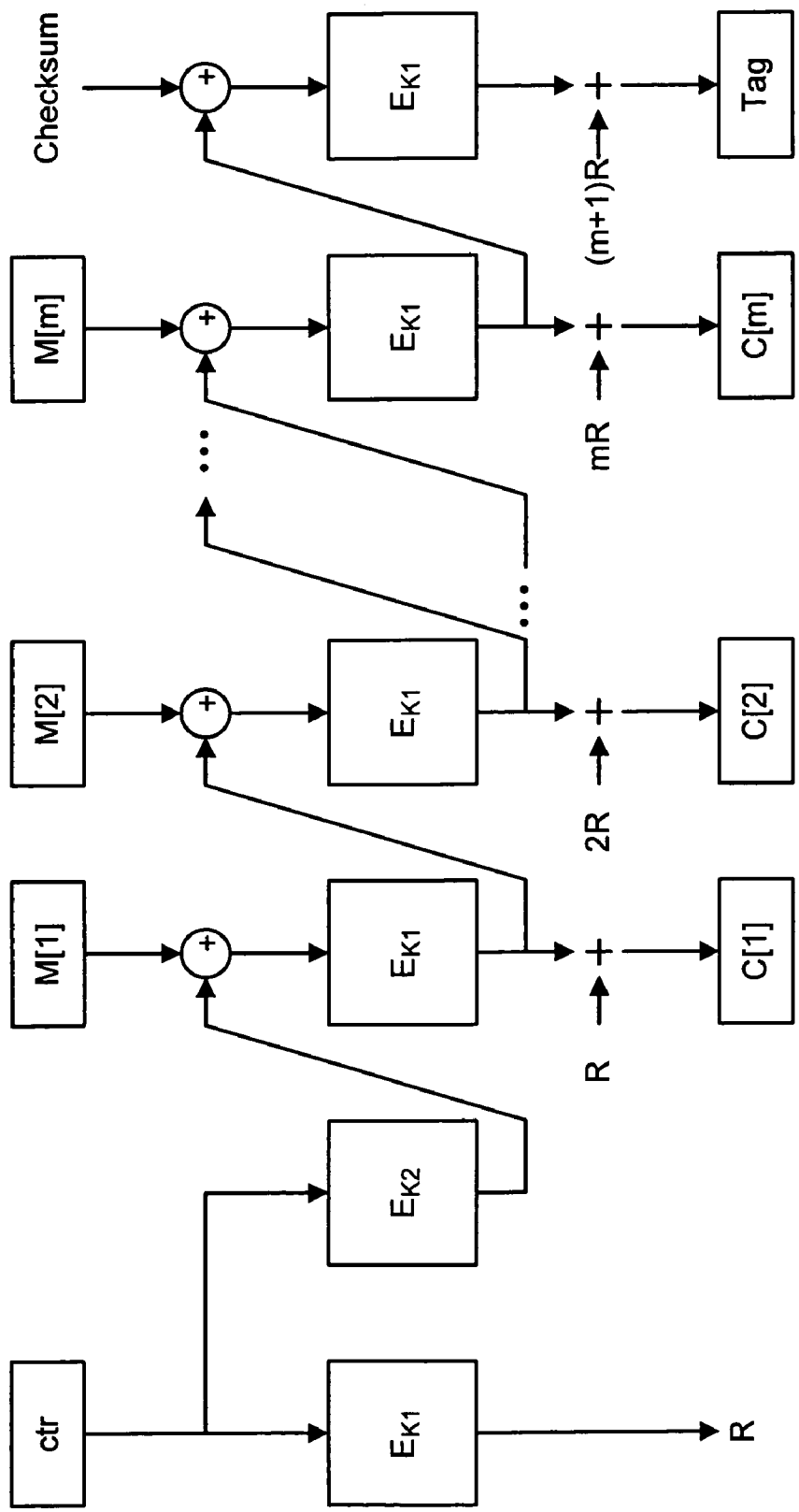
FIG. 10 depicts the XCBC scheme of Gligor and Donescu.

It is even possible to allow PreFullTag to inadequately depend on the message fragment/ciphertext fragment, as long as this dependency is realized in the FullTag itself. An example of such an OCB variant is shown in FIG. 5. In that variant, Pad does not depend on the bit length of M[m], but only on the block length of M. The checksum is defined differently from before; it is now defined by Checksum=M $[1] \oplus \ldots \oplus (M[m-1] \oplus pad(M[m])$, where $pad(A)=A$ if A is n bits long and $pad(A)=A||10^{n-|A|-1}$ otherwise. With such a scheme, PreFullTag would seem to inadequately depend on the message; for example, $1^n$ and $1^{n-1}$ give rise to identical checksums, as well as ciphertext cores that differ by just one bit. So if the authentication tag were taken to be FullTag*, the scheme would be insecure. To differentiate pairs of strings like $1^n$ and $1^{n-1}$, the scheme of FIG. 5 modifies the value FullTag*=$E_K$(PreFullTag) by xoring it with one of two different offsets, 0 or Z[m+1]. The first offset is used if the message fragment is n bits long (so no padding was appended to the message fragment when forming the checksum), while the second offset is used when the message fragment has fewer than n bits (so 10* padding was appended to it when forming the checksum). Now strings such as $1^n$ and $1^{n-1}$ will give rise to the same FullTag* but different FullTag values.

Many other correct variants of OCB are possible, as a person skilled in the art will now be able to discern.

A variant in a different direction is to facilitate the efficient processing of associated-data. Associated-data refers to information which the Receiver would like to ensure that he shares (in identical form) with the Sender, but where this information is not a part of the message that is being encrypted. Such information is usually non-secret, and it is usually held static during the course of a session (that is, all messages encrypted using a given key will usually share the same associated-data). The associated-data is a vector of strings AD, or it is a single string AD that encodes such a vector of strings.

An authenticated-encryption scheme that permits associated-data can be regarded as an authenticated-encryption scheme in which there is an extra argument, AD, supplied to both the encryption function E and the decryption function D. The Sender encrypts using $E_K$(Nonce, AD, M), while the Receiver decrypts using $D_K$(Nonce, AD, C). If the Receiver supplies an AD-value which is different from the one which the Sender used, the ciphertext C, on decryption, will almost certainly be regarded as invalid.

A method to allow for associated-data that will be obvious to those skilled in the art is to have the Sender encode AD along with the message M, obtaining an augmented message M', and then have the Sender encrypt M', with authenticity, using an authenticated-encryption scheme. But this method is inefficient, insofar as the ciphertext C' that one obtains is longer than a ciphertext C would be for M. The increase in length is by an amount proportional to the length of AD. Also, extra processing time is needed to encrypt and to decrypt (even when AD is held constant across many messages).

The inventive methods permit more efficient processing of associated-data than what is described above. We illustrate the method for encryption under $OCB_K$ (Nonce, AD, M). Let F be a function of the key K and the associated-data AD. The inventive method begins by computing $\Delta = F_K(AD)$. In a first technique, ciphertext $OCB_K$ (Nonce, AD, M) is then defined as $OCB_\Delta$ (Nonce, M). In an alternative technique, the ciphertext $OCB_K$ (Nonce, AD, M) is defined as $OCB_K$ (Nonce$\oplus \Delta$, M). In yet another alternative, ciphertext $OCB_K$ (Nonce, AD, M) is defined as (C, Tag$\oplus \Delta$), where (C,T) =$OCB_K$ (Nonce, M). Decryption proceeds according to the obvious associated algorithm, as those skilled in the relevant art will infer. Other ways to modify the process of computing ciphertexts under $OCB_K$ (Nonce, M) which make use of $\Delta$ will be apparent to those skilled in the relevant art.

The inventive method has the advantage that the ciphertext is not lengthened because of the presence of the associated-data, and the processing time is not significantly increased, assuming that $\Delta$ has been pre-computed.

The description of the inventive method uses one key K for both $F_K(\cdot)$ and $OCB_K(\cdot, \cdot)$. This is advantageous, but two separate keys may of course be used instead.

There are many options for realizing the function F used above. For example, F may be the CBC MAC described earlier. Alternatively, F may be obtained from a cryptographic hash function, or from a universal hash function.

There are also many options for realizing the encoding of a vector of strings AD into a string AD. For example, one can concatenate an encoding of each string in the vector of strings, where the encoding of each string in the vector of strings consists of a fixed-byte encoding of the string's length, followed by the string itself.

The associated-data techniques we have described are applicable to any authenticated-encryption scheme, without restriction. The technique can be used in conjunction with the other inventive teachings, or the technique can be used independently. Its use in conjunction with other inventive teachings does not limit the scope of those teachings, and mechanisms which allow the presence of associated-data should be understood as covered by claims which do not explicitly refer to the presence of associated-data.

Execution Vehicles

The encryption and the decryption process used by the present invention may reside, without restriction, in software, firmware, or in hardware. The execution vehicle might be a computer CPU, such as those manufactured by Intel Corporation and used within personal computers. Alternatively, the process may be performed within dedicated hardware, as would typically be found in a cell phone or a wireless LAN communications card or the hardware associated to the Access Point in a wireless LAN. The process might be embedded in the special-purpose hardware of a high-performance encryption engine. The process may be performed by a PDA (personal digital assistant), such as a Palm Pilot®. In general, any engine capable of performing a complex sequence of instructions and needing to provide a privacy and authenticity service is an appropriate execution vehicle for the invention.

The various processing routines that comprise the present invention may reside on the same host machine or on different host machines interconnected over a network (e.g., the Internet, an intranet, a wide area network (WAN), or local area network (LAN)). Thus, for example, the encryption of a message may be performed on one machine, with the associated decryption performed on another machine, the two communicating over a wired or wireless LAN. In such a case, a machine running the present invention would have appropriate networking hardware to establish a connection to another machine in a conventional manner. Though we speak of a Sender and a Receiver performing encryption and decryption, respectively, in some settings (such as file encryption) the Sender and Receiver are a single entity, at different points in time.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-implemented authenticated-encryption method that uses an n-bit block cipher, a key, and an n-bit nonce to encrypt a message into a ciphertext, the method comprising:
   partitioning the message into m−1 message blocks and one final fragment, each message block having n bits and the final fragment having between 0 and n bits;
   using the block cipher, the key, and the nonce to generate a sequence of m offsets, each offset having n bits, wherein the sequence of offsets is computed by (a) computing a $0^{th}$ basis offset by applying the block cipher, keyed by the key, to a constant; (b) for each positive number i, defining the $i^{th}$ basis offset from the prior basis offset by shifting the prior basis offset left one position, and then xoring the resulting value with a constant that depends on the first bit of the prior basis offset; (d) computing a base offset by applying the block cipher, keyed by the key, to the xor of the $0^{th}$ basis offset and the nonce; (e) defining the $1^{st}$ offset in the sequence of offsets as the xor of the $0^{th}$ basis offset and the base offset; and (f) for each integer i between two and m, defining the $i^{th}$ offset in the sequence of offsets as the xor of the prior offset and the $j^{th}$ basis offset, where j is the number of zero-bits following the last one-bit when the number i is written in binary;
   using the block cipher, the key, the nonce, and the length of the message to generate an n-bit final offset;
   for each number i between 1 and m−1, xoring the $i^{th}$ message block with the $i^{th}$ offset to determine an $i^{th}$ input block;
   for each number i between 1 and m−1, applying the block cipher, keyed by the key, to the $i^{th}$ input block, to determine an $i^{th}$ output block;
   for each number i between 1 and m−1, xoring the $i^{th}$ output block with the $i^{th}$ offset to determine an $i^{th}$ ciphertext block;
   concatenating the m−1 ciphertext blocks to determine a ciphertext body;
   computing an encoded length by encoding the length of the final fragment as an n-bit string;
   xoring the encoded length with the final offset to determine a precursor pad;
   computing a pad by applying the block cipher, keyed by the key, to the precursor pad;
   xoring the final fragment with a portion of the pad to determine a ciphertext fragment having the same length as the final fragment;
   computing a padded ciphertext fragment by appending to the ciphertext fragment a sufficient number of zero bits so that the padded ciphertext fragment has n bits;
   computing a checksum by xoring together the m−1 message blocks, the pad, and the padded ciphertext fragment;
   computing a precursor full tag by xoring together the checksum and the $m^{th}$ offset;
   determining a full tag by applying the block cipher, keyed by the key, to the precursor full tag;
   computing a tag as a portion of the full tag; and
   defining the ciphertext to be the ciphertext body, the ciphertext fragment, and the tag.

2. A computer-readable storage medium storing instructions that when executed by a computer cause the computer to perform an authenticated-encryption method that uses an n-bit block cipher, a key, and an n-bit nonce to encrypt a message into a ciphertext, the method comprising:
   partitioning the message into m−1 message blocks and one final fragment, each message block having n bits and the final fragment having between 0 and n bits;
   using the block cipher, the key, and the nonce to generate a sequence of m offsets, each offset having n bits, wherein the sequence of offsets is computed by (a) computing a $0^{th}$ basis offset by applying the block cipher, keyed by the key, to a constant; (b) for each positive number i, defining the $i^{th}$ basis offset from the prior basis offset by shifting the prior basis offset left one position, and then xoring the resulting value with a constant that depends on the first bit of the prior basis offset; (d) computing a base offset by applying the block cipher, keyed by the key, to the xor of the $0^{th}$ basis offset and the nonce; (e) defining the $1^{st}$ offset in the sequence of offsets as the xor of the $0^{th}$ basis offset and the base offset; and (f) for each integer i between two and m, defining the $i^{th}$ offset in the sequence of offsets as the xor of the prior offset and the $j^{th}$ basis offset, where j is the number of zero-bits following the last one-bit when the number i is written in binary;
   using the block cipher, the key, the nonce, and the length of the message to generate an n-bit final offset;
   for each number i between 1 and m−1, xoring the $i^{th}$ message block with the $i^{th}$ offset to determine an $i^{th}$ input block;
   for each number i between 1 and m−1, applying the block cipher, keyed by the key, to the $i^{th}$ input block, to determine an $i^{th}$ output block;
   for each number i between 1 and m−1, xoring the $i^{th}$ output block with the $i^{th}$ offset to determine an $i^{th}$ ciphertext block;

concatenating the m−1 ciphertext blocks to determine a ciphertext body;

computing an encoded length by encoding the length of the final fragment as an n-bit string;

xoring the encoded length with the final offset to determine a precursor pad;

computing a pad by applying the block cipher, keyed by the key, to the precursor pad;

xoring the final fragment with a portion of the pad to determine a ciphertext fragment having the same length as the final fragment;

computing a padded ciphertext fragment by appending to the ciphertext fragment a sufficient number of zero bits so that the padded ciphertext fragment has n bits;

computing a checksum by xoring together the m−1 message blocks, the pad, and the padded ciphertext fragment;

computing a precursor full tag by xoring together the checksum and the $m^{th}$ offset;

determining a full tag by applying the block cipher, keyed by the key, to the precursor full tag;

computing a tag as a portion of the full tag; and defining the ciphertext to be the ciphertext body, the ciphertext fragment, and the tag.

3. A computer-implemented authenticated-encryption method that uses an n-bit block cipher, a key, and an n-bit nonce to encrypt a message of arbitrary length into a ciphertext of the same length, the method comprising:

partitioning the message into m−1 message blocks and one final fragment, each message block having n bits and the final fragment having between 0 and n bits;

generating m+1 offsets using a sequence shift and xor operations, this sequence of shift and xor operations being applied to a starting value determined using the block cipher, the key, and the nonce;

for each number i between 1 and m−1, xoring the $i^{th}$ message block with the $i^{th}$ offset to determine an $i^{th}$ input block;

for each number i between 1 and m−1, applying the block cipher, keyed by the key, to the $i^{th}$ input block, to determine an $i^{th}$ output block;

for each number i between 1 and m−1, xoring the it $i^{th}$ output block with the $i^{th}$ offset to determine an $i^{th}$ ciphertext block;

concatenating the m−1 ciphertext blocks to determine a ciphertext body;

computing an encoded length by encoding the length of the final fragment as an n-bit string;

xoring the encoded length with the $m^{th}$ offset to determine a precursor pad;

computing a pad by applying the block cipher, keyed by the key, to the precursor pad;

xoring the final fragment with a portion of the pad to determine a ciphertext fragment having the same length as the final fragment;

computing a padded ciphertext fragment by appending to the ciphertext fragment a sufficient number of zero bits so that the padded ciphertext fragment has n bits;

computing a checksum by xoring together the m−1 message blocks, the pad, and the padded ciphertext fragment;

computing a precursor full tag by xoring together the checksum and the $(m+1)^{st}$ offset;

determining a full tag by applying the block cipher, keyed by the key, to the precursor full tag;

computing a tag as a portion of the full tag; and defining the ciphertext to be the ciphertext body, the ciphertext fragment, and the tag.

4. A computer-readable storage medium storing instructions that when executed by a computer cause the computer to perform an authenticated-encryption method that uses an n-bit block cipher, a key, and an n-bit nonce to encrypt a message of an arbitrary length into a ciphertext of the same length, the method comprising:

partitioning the message into m−1 message blocks and one final fragment, each message block having n bits and the final fragment having between 0 and n bits;

generating m+1 offsets using a sequence shift and xor operations, this sequence of shift and xor operations being applied to a starting value determined using the block cipher, the key, and the nonce;

for each number i between 1 and m−1, xoring the $i^{th}$ message block with the $i^{th}$ offset to determine an $i^{th}$ input block;

for each number i between 1 and m−1, applying the block cipher, keyed by the key, to the $i^{th}$ input block, to determine an $i^{th}$ output block;

for each number i between 1 and m−1, xoring the $i^{th}$ output block with the $i^{th}$ offset to determine an $i^{th}$ ciphertext block;

concatenating the m−1 ciphertext blocks to determine a ciphertext body;

computing an encoded length by encoding the length of the final fragment as an n-bit string;

xoring the encoded length with the $m^{th}$ offset to determine a precursor pad;

computing a pad by applying the block cipher, keyed by the key, to the precursor pad;

xoring the final fragment with a portion of the pad to determine a ciphertext fragment having the same length as the final fragment;

computing a padded ciphertext fragment by appending to the ciphertext fragment a sufficient number of zero bits so that the padded ciphertext fragment has n bits;

computing a checksum by xoring together the m−1 message blocks, the pad, and the padded ciphertext fragment;

computing a precursor full tag by xoring together the checksum and the $(m+1)^{st}$ offset;

determining a full tag by applying the block cipher, keyed by the key, to the precursor full tag;

computing a tag as a portion of the full tag; and defining the ciphertext to be the ciphertext body, the ciphertext fragment, and the tag.

* * * * *